United States Patent
Vrzic

(10) Patent No.: US 10,791,040 B2
(45) Date of Patent: Sep. 29, 2020

(54) SYSTEMS AND METHODS FOR NETWORK SLICE MANAGEMENT

(71) Applicant: Sophie Vrzic, Kanata (CA)

(72) Inventor: Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 15/348,730

(22) Filed: Nov. 10, 2016

(65) Prior Publication Data

US 2017/0141973 A1    May 18, 2017

Related U.S. Application Data

(60) Provisional application No. 62/255,102, filed on Nov. 13, 2015, provisional application No. 62/269,691, (Continued)

(51) Int. Cl.
*H04L 12/24* (2006.01)
*H04W 76/11* (2018.01)
(Continued)

(52) U.S. Cl.
CPC ...... *H04L 41/5054* (2013.01); *H04L 41/5051* (2013.01); *H04L 47/2408* (2013.01); (Continued)

(58) Field of Classification Search
USPC ........................................................ 709/226
See application file for complete search history.

(56) References Cited

U.S. PATENT DOCUMENTS

2008/0137595 A1* 6/2008 Surazski ............... H04W 76/12
370/329
2011/0276447 A1   11/2011 Paul et al.
(Continued)

FOREIGN PATENT DOCUMENTS

CN    103782556 A    5/2014
CN    104253767 A    12/2014
(Continued)

OTHER PUBLICATIONS

3GPP TR 22.891 entitled Study on New Services and Markets Technology Enablers.
(Continued)

*Primary Examiner* — Hermon Asres

(57) ABSTRACT

A method of generating a network slice is provided. The method comprises a network slice orchestrator (NWSO) receiving from a network slice manager (NWSM) a request for a new network slice, the NWSO adding a new service to the new network slice, the NWSO determining a network slice descriptor (NWSD) for the new network slice, the NWSO transmitting to a resource orchestrator (RO) a request for an instantiation of the network slice using enhanced network function virtualization management and orchestration (E-MANO). A method of modifying a network slice is also provided. The method comprises a NWSO receiving from a NWSM a request to add a new service to a network slice, the NWSO adding a new service to the network slice, the NWSO determining a NWSD for the network slice with the added service, and the NWSO transmitting to a RO a request for an instantiation of the added service on the network slice using E-MANO. A method of terminating a network slice is also provided. The method comprises a NWSO receiving from a NWSM a request to terminate a network slice, the NWSO determining the sub-
(Continued)

networks to terminate, and the NWSO transmitting to a RO a request for a termination of the slice specific network functions (NFs).

20 Claims, 24 Drawing Sheets

Related U.S. Application Data filed on Dec. 18, 2015, provisional application No. 62/320,262, filed on Apr. 8, 2016, provisional application No. 62/337,122, filed on May 16, 2016, provisional application No. 62/358,498, filed on Jul. 5, 2016.

(51) Int. Cl.
| | | |
|---|---|---|
| *H04W 24/02* | (2009.01) | |
| *H04L 12/851* | (2013.01) | |
| *H04L 29/08* | (2006.01) | |
| *H04W 16/02* | (2009.01) | |
| *H04W 24/08* | (2009.01) | |
| *H04W 28/02* | (2009.01) | |
| *H04W 48/06* | (2009.01) | |
| *H04L 12/927* | (2013.01) | |

(52) U.S. Cl.
CPC ............ *H04L 67/16* (2013.01); *H04L 67/303* (2013.01); *H04W 16/02* (2013.01); *H04W 24/02* (2013.01); *H04W 24/08* (2013.01); *H04W 28/0289* (2013.01); *H04W 48/06* (2013.01); *H04W 76/11* (2018.02); *H04L 47/805* (2013.01); *H04L 67/141* (2013.01)

(56) References Cited

U.S. PATENT DOCUMENTS

| | | |
|---|---|---|
| 2013/0007232 A1 | 1/2013 | Wang et al. |
| 2013/0212285 A1 | 8/2013 | Hoffmann et al. |
| 2014/0293882 A1 | 10/2014 | Choi et al. |
| 2015/0029853 A1 | 1/2015 | Raindel et al. |
| 2015/0063166 A1 | 3/2015 | Sif et al. |
| 2015/0257012 A1* | 9/2015 | Zhang ..................... H04L 12/14 455/454 |
| 2015/0271078 A1* | 9/2015 | Rath ....................... H04L 45/64 370/235 |
| 2015/0365288 A1 | 12/2015 | Van Der Merwe et al. |
| 2017/0093748 A1 | 3/2017 | Kallin et al. |
| 2017/0164212 A1* | 6/2017 | Opsenica .............. H04W 84/00 |
| 2017/0295531 A1* | 10/2017 | Singh .................... H04W 76/14 |
| 2019/0021047 A1 | 1/2019 | Zong |

FOREIGN PATENT DOCUMENTS

| | | |
|---|---|---|
| EP | 2478667 A1 | 7/2012 |
| WO | 2011032595 A1 | 3/2011 |
| WO | 2014205786 A1 | 12/2014 |
| WO | 2015021248 A1 | 2/2015 |
| WO | 2015149600 A1 | 10/2015 |
| WO | 2017023196 A1 | 2/2017 |
| WO | 2017025149 A1 | 2/2017 |
| WO | WO-2017025149 A1 * | 2/2017 ......... H04L 63/0892 |

OTHER PUBLICATIONS

ETSI GS NFV 001 entitled "Network Function Virtualization (NFV); Use Cases", Oct. 2013.
ETSI GS NFV 002 entitled "Network Function Virtualization (NFV); Architectural Framework", Oct. 2013.
3GPP TR 23.707, entitled "Architecture Enhancements for Dedicated Core Networks; Stage 2," V. 13.0.0, Dec. 17, 2014.
NTT DOCOMO S1-152156: Network Slicing—Service/ Traffic Dependent Selection 3GPP TSG-SA WG1 Meeting #71. Aug. 21, 2015.
Telecommunication Standardization Sector IMT-I-096r1, International Telecommunication Union Focus Group on IMT-2020,"Draft deliverable of Network softwarization for IMT-2020 networks", Network Softwarization group, Beijing, Oct. 21-30, 2015, total 64 pages.
ETSI GS NFV-MAN 001 V1.1.1 (Dec. 2014),Network Functions Virtualisation (NFV);Management and Orchestration,total 184 pages.
Hou Jianxing et al, Network Slice Application Analysis in 5G. Proceedings of the 2015 Annual Meeting of the Information and Communication Network Technical Committee of China Communications Society, Aug. 1, 2015, 4 pages.
ZTE, Motivation for Core Network Slicing Study in SA2. SA WG2 Meeting #110 Jul. 6-10, 2015, Dubrovnik, Croatia, S2-152420, 3 pages.

* cited by examiner

| Identifier | Description |
|---|---|
| NWS ID | Network slice ID |
| Common_nsd | Common sub-network described by a network service ID (NSD) |
| Slice_specific_nsd | Slice specific sub-network described by an NSD |
| Common_nds_endpoint | |
| Slice_specific_nsd_endpoint | |

| Identifier | Description |
|---|---|
| NWS ID | Network slice ID |
| NWSFG | Network slice forwarding graph |

| Identifier | Description |
|---|---|
| id | Network slice forwarding graph ID |
| Common_nsd | NSD that describes the common sub-network |
| Slice_specific_nsd | NSD that describes the slice specific sub-network |

FIG. 12B

| Identifier | Cardinality | Description |
|---|---|---|
| id | 1 | ID of the network slice descriptor |
| type | 1 | Network slice type (e.g., MBB, URLL) |
| NDS | 1..N | NDS which is a part of this network slice |
| res_reservation | 1 | Required resources to be reserved (percentage or amount) for this network slice type (may be per VIM) |
| Res_quota | 1 | Resource quota (percentage or amount) for this network slice type (may be per VIM) |

| Identifier | Cardinality | Description |
|---|---|---|
| id | 1 | ID of the network slice instance |
| type | 1 | Network slice type (e.g., MBB, URLL, etc.) |
| NSR | 1..N | Network service record (NSR) which is a part of this network slice |
| res_reservation | 1 | Resources reserved for this network slice instance (may be per VIM) |
| Res_quota | 1 | Resource quota for this network slice instance (may be per VIM) |

SYSTEMS AND METHODS FOR NETWORK SLICE MANAGEMENT

CROSS-REFERENCE TO RELATED APPLICATIONS

This application claims the benefit of priority to U.S. Provisional Patent Application No. 62/255,102 filed Nov. 13, 2015, U.S. Provisional Patent Application No. 62/269,691 filed Dec. 18, 2015, U.S. Provisional Patent Application No. 62/320,262 filed Apr. 8, 2016, U.S. Provisional Patent Application No. 62/337,122 filed May 16, 2016, and U.S. Provisional Patent Application No. 62/358,498 filed Jul. 5, 2016, the contents of each of which are incorporated herein by reference in their entirety.

FIELD OF THE INVENTION

The present invention pertains to the field of network communications, and in particular to systems and methods for implementing network slice management.

BACKGROUND

Communication networks enabled by technologies such as network function virtualization (NFV), and software defined networking (SDN) may be flexibly organized so as to serve various customer demands. In building advanced networks, such as those to support future developments in wireless networks (including next generation wireless, such as so-called fifth generation (5G) networks), network slicing provides the ability to create isolated virtual networks over which different traffic flows can travel. Network slicing provides flexibility and adaptability in the characteristics of each slice. This allows the slices to each have characteristics tailored to the specific needs of different services. This allows a plurality of different services to be supported by a single pool of network infrastructure, which is a desired feature for 5G networks. However, managing variable and competing demands on a potentially large network scale is a complex proposition requiring an effective architecture and management thereof. The problem of managing the different demands becomes exacerbated when there are demands for a number of different types of services. To date, no one has developed a standardized architecture to manage different slices in a mobile network.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for network slice operations.

In accordance with embodiments of the present invention, there is provided a method of generating a network slice. The method comprises a network slice orchestrator (NWSO) receiving from a network slice manager (NWSM) a request for a new network slice, the NWSO adding a new service to the new network slice, the NWSO determining a network slice descriptor (NWSD) for the new network slice, the NWSO transmitting to a resource orchestrator (RO) a request for an instantiation of the network slice using enhanced network function virtualization management and orchestration (E-MANO).

In accordance with embodiments of the present invention, there is provided a method of modifying a network slice. The method comprises a NWSO receiving from a NWSM a request to add a new service to a network slice, the NWSO adding a new service to the network slice, the NWSO determining a NWSD for the network slice with the added service, and the NWSO transmitting to a RO a request for an instantiation of the added service on the network slice using E-MANO.

In accordance with embodiments of the present invention, there is provided a method of terminating a network slice. The method comprises a NWSO receiving from a NWSM a request to terminate a network slice, the NWSO determining the subnetworks to terminate, and the NWSO transmitting to a RO a request for a termination of the slice specific network functions (NFs).

BRIEF DESCRIPTION OF THE FIGURES

Further features and advantages of the present invention will become apparent from the following detailed description, taken in combination with the appended drawings, in which:

FIG. 11 illustrates an example of a NWSD information element (IE);

FIGS. 12A and 12B illustrate an alternative example for an NWSD IE;

FIG. 12C illustrates, in an IE chart, another example of a NWSD;

FIG. 12D illustrates, in an IE chart, an example of a network slice instance record corresponding to the NWSD IE of FIG. 12C;

It will be noted that throughout the appended drawings, like features are identified by like reference numerals.

DETAILED DESCRIPTION

Figure 1:
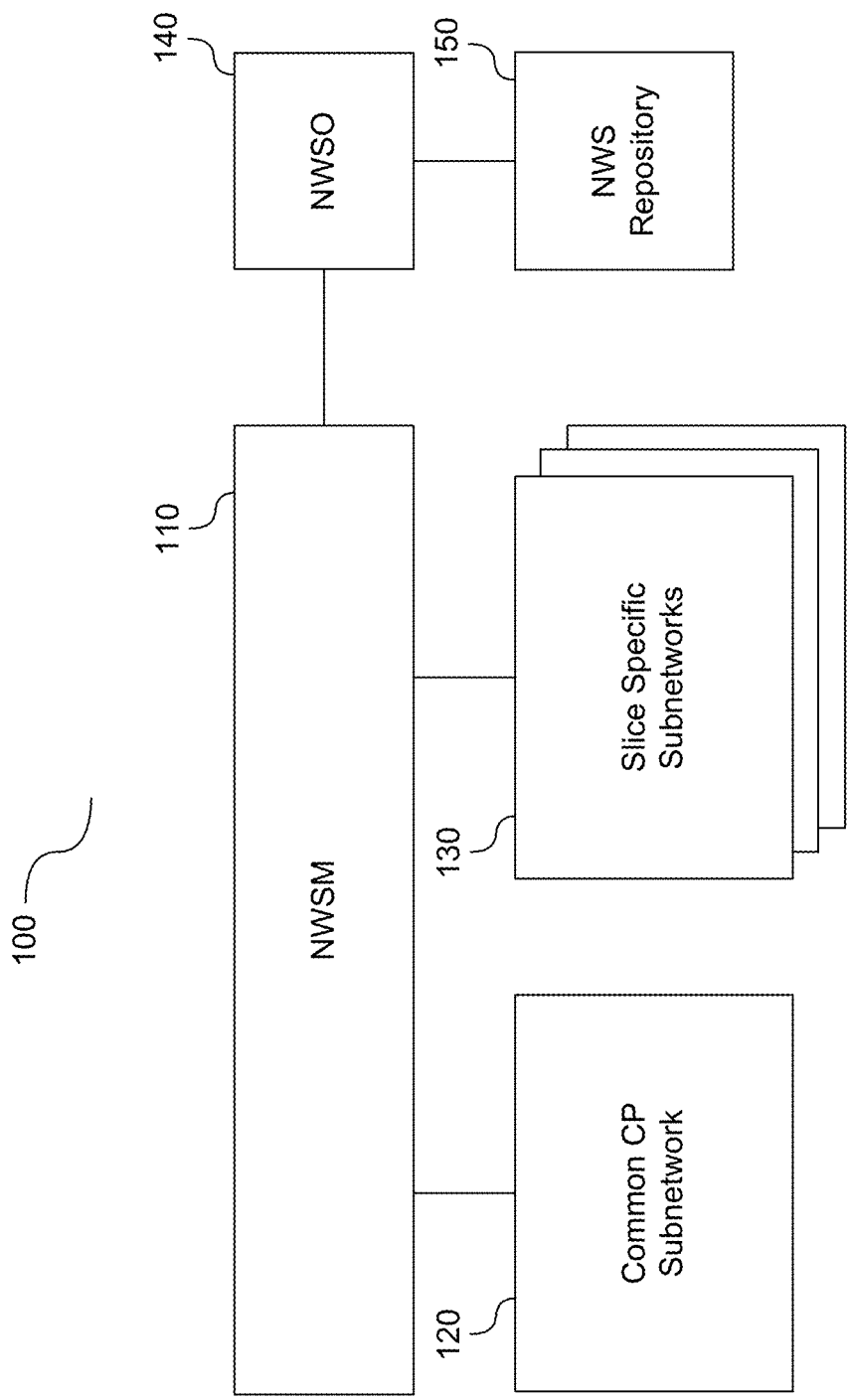
FIG. 1 illustrates an overview of a network slice management and orchestration architecture, in accordance with an embodiment of the present invention.

Embodiments of the present invention are directed towards systems and methods for implementing network slicing in telecommunication networks.

As used herein, a "network" or "communication network" may service various devices including but is not necessarily limited to, wireless devices. Such a network may include a radio access portion and a backhaul portion. The network may further comprise various virtualized components as will become readily apparent herein. A primary example of such a network is a 5G network, which is reconfigurable and capable of network slicing, as described below.

Network slicing relates to the ability of a network, such as a 5G communication network accessible by wireless devices, to provide multiple logical network slices on demand, with each network slice operating as a substantially separate network for different market scenarios which demand diverse requirements. The capabilities and operating parameters of each network slice may be customized to the service requirements. Configuration of the network slices may be based on software defined networking, network function virtualization and network orchestration.

Network slicing refers to a technique for separating different types of network traffic which can be used in reconfigurable network architectures, such as networks employing network function virtualization (NFV). A network slice (as defined in 3GPP TR 22.891 entitled "Study on New Services and Markets Technology Enablers") is a collection of logical network functions (NFs) that supports the communication service requirements of a particular network service. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing to the radio access edge of the radio access network (RAN), which may use specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

Network slicing allows the instantiation of separate network slices respectively directed toward different network services. This allows different types of traffic to be isolated from each other by assigning each traffic type to a different slice. Each slice can have characteristics tailored to the needs of the traffic flow it carries. Such needs may include different packet processing requirements, different service requirements, and different quality of service (QoS) requirements. Different network slices corresponding to different allocations of pooled resources may offer different services to different customers, or groups of customers. The different services may be supported by different network slices (a network slice may be considered as a type of customized virtual network), where the different network slices (i.e., different customized virtual networks) are substantially separate from one another from the customer's point of view though they may share common physical network resources. The pooled resources may be commercial off-the-shelf hardware components capable of configuration through virtualization approaches, such as NFV, in order to support various network functionalities for supporting the operations of the network slices.

The NFV framework can be used to define a plurality of virtual network functions (VNFs), each of which may include a function to enable the operation of a communications network. For example, a VNF can provide the functions of any of a router, switch, gateway, firewall, load balancer, server, and the like. The network function is virtualized in the sense that it may utilize a set of virtual resources. I.e., from a single pool of physical resources, allocations of the storage, processing and networking connectivity may be presented as virtual processors, storage and networking interfaces. While dedicated hardware may be used for each function, a virtual representation of the physical function may be presented to in-slice entities. As such, VNFs may be instantiated on one or more processing elements on an as-needed basis using available virtual resources. NFV architecture is described, for example, in ETSI GS NFV 001 entitled "Network Function Virtualization (NFV); Use Cases", October 2013, and ETSI GS NFV 002 entitled "Network Function Virtualization (NFV); Architectural Framework", October 2013. VNFs may be instantiated across a plurality of processing elements, at least two of which are at different physical location locations within the network. Accordingly, the VNFs may "extend" across multiple physical processing elements in a coordinated fashion to provide physical extension of the functions.

Examples of network services which may be offered in a slice can include, for example: a service, such as a mobile broadband (MBB) service (or an enhanced MBB (eMBB) service), which can be suitable for downloading and browsing websites but for which ultra-low latency and a relatively high reliability guarantee (which may require redundancy in the transmission channels) are not typically considered critical features; another service, such as a machine type communication (MTC) service which serves devices that do not require mobility support (e.g., for smart meters); and another service, such as critical mobile machine-type communication services (for example, eHealth/mHealth for providing real time health care information, possibly in emergency situations or to moving ambulances, smart grids, etc.), which require mobility support. The critical machine-type communication services may require an ultra-reliable low latency (URLL) connection.

FIG. 1 illustrates an overview of a network slice management and orchestration architecture 100, in accordance with an embodiment of the present invention. Within the network architecture 100 there can be a network slice manager (NWSM) 110, at least one common control plane (common CP) subnetwork 120, one or more slice specific subnetworks 130, a network slice orchestrator (NWSO) 140 and a network slice instance (NWS) repository 150. The common CP subnetwork 120 may be associated with a plurality of slice specific subnetworks 130 (i.e., a one-to-many arrangement with one common CP subnetwork 120 shared by many slice specific subnetworks 130). It should be understood that a common CP network is one that is available for use with a plurality of different subnetworks, even though at some points in time it may only be used by a single subnetwork. Additionally, there may be a plurality of common CP subnetworks 120, each associated with at least one slice specific subnetwork 130. (i.e., each separate set of at least one slice specific subnetwork 130 share the respective common CP subnetwork to which they are associated.) Alternative architectures and combinations may include many-to-many or many-to-one relationships between the common CP subnetworks 120 and slice specific subnetworks 130.

The NWSM 110 manages the lifecycle of network slices, including the instantiation/generation, modification/update and termination of the slices. The common CP subnetwork 120 may also be called a common CP subslice or common CP set of functions, and it may include CP network functions that can be common to (i.e., shared by) a plurality of network slices. It should be understood that a common CP network function may, at some points in time, only be used by a single slice, but it remains available for use by others. The slice specific subnetworks 130 may also be called slice specific subslices or slice specific sets of functions. The slice specific CP subnetworks 130 include user plane (UP) and optionally CP network functions that are specific to a particular network slice. A network slice may be defined as a combination of one common CP subnetwork 120 and one slice specific CP subnetwork 130. Some network slices may comprise a plurality of common CP subnetworks 120 with a slice specific subnetwork 130. The network management functions for the common CP subnetwork 120 and slice specific subnetwork 130 may be included within the slice formed by the Common and slice specific NFs. Alternatively, the network management functions may be external to the network slice. The NWSO 140 may be used to reserve or dedicate resources (compute, storage and network) for each network slice so that there is resources isolation between slices. The NWSO 140 may assign each slice a quota indicating a floor for the resource allocation. The network slice instance repository 150 may be embodied within a database of available network slice instances and subscriber profile information for services on those network slice instances.

Figure 2:
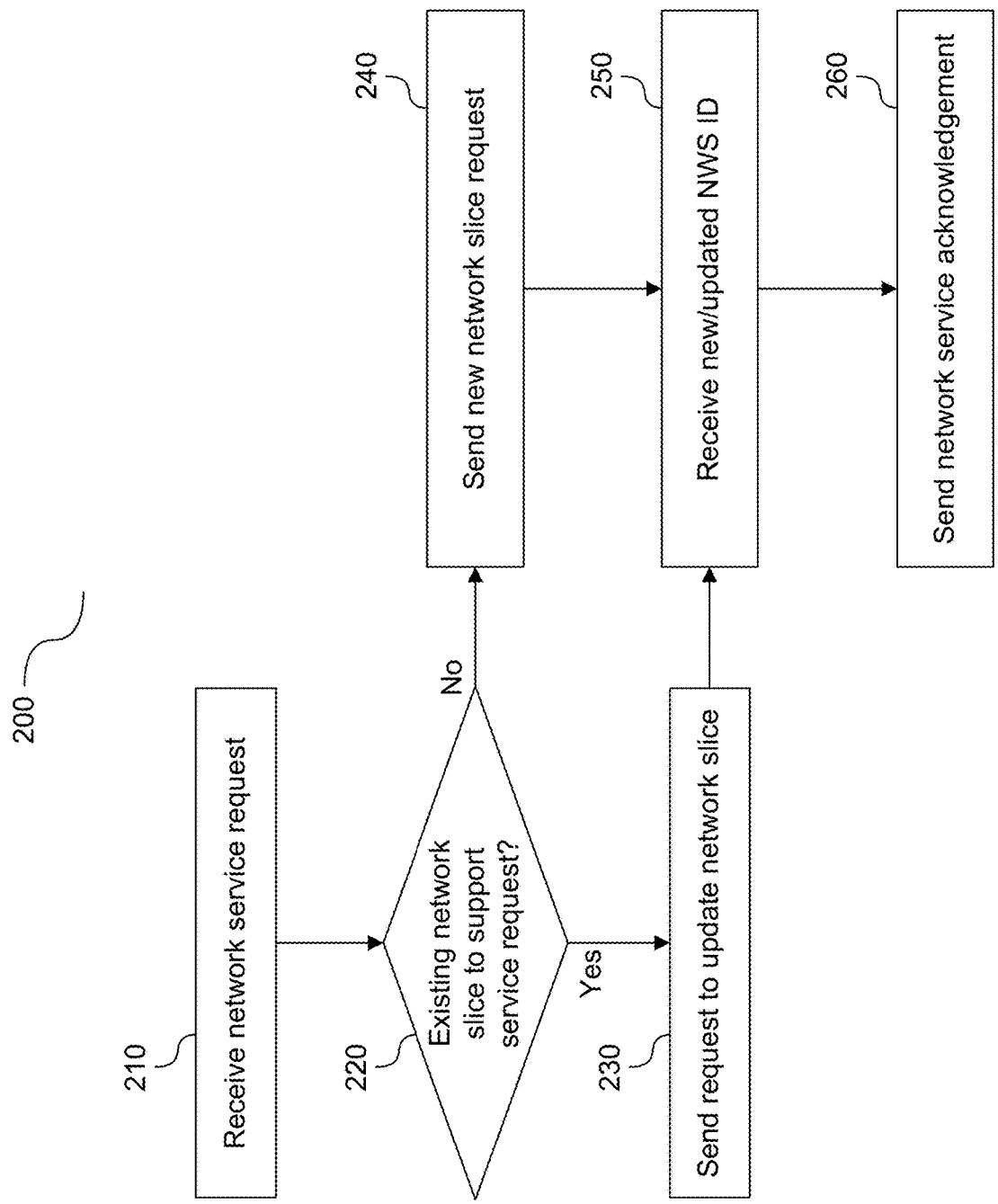
FIG. 2 illustrates, in a flow chart, a method of processing a network service request by a network slice manager.

FIG. 2 illustrates, in a flow chart, a method of processing a network service request (200) by a NWSM 110. The method comprises receiving, by the NWSM 110, an end user network service request (210) from a customer (e.g., a service provider). The NWSM 110 determines (220) whether the requested network service can be accommodated by a network slice that already exists. If the service can be accommodated in an existing slice, the NWSM 110 sends to the NWSO 140 the identifier of the network slice with a request to updated the network slice to include the requested network service (230). If the service cannot be accommodated in an existing slice, or if the network service request specifies a request for a new slice regardless of whether there is a suitable existing slice, the decision in (220) is taken to proceed to (240). When the service will be accommodated in a new slice, the NWSM 110 sends a new network slice request (240) to the NWSO 140. The NWSO 140 generates a new network slice descriptor (NWSD) for a new network slice or updates an existing NWSD to include the requested network service. The NWSO 140 passes the new or updated NWSD to a resource orchestrator (RO) for the instantiation of the new service. When the NWSM 110 receives the NWS ID for the newly created/updated network slice (250), the NWSM 110 sends an acknowledgement to the requesting customer (260). The acknowledgement may include the new NWS ID or an identifier that is representative of the NWS ID. The acknowledgement may include a service identifier for the requested network service. Other steps may be added to the method (200).

Figure 3:
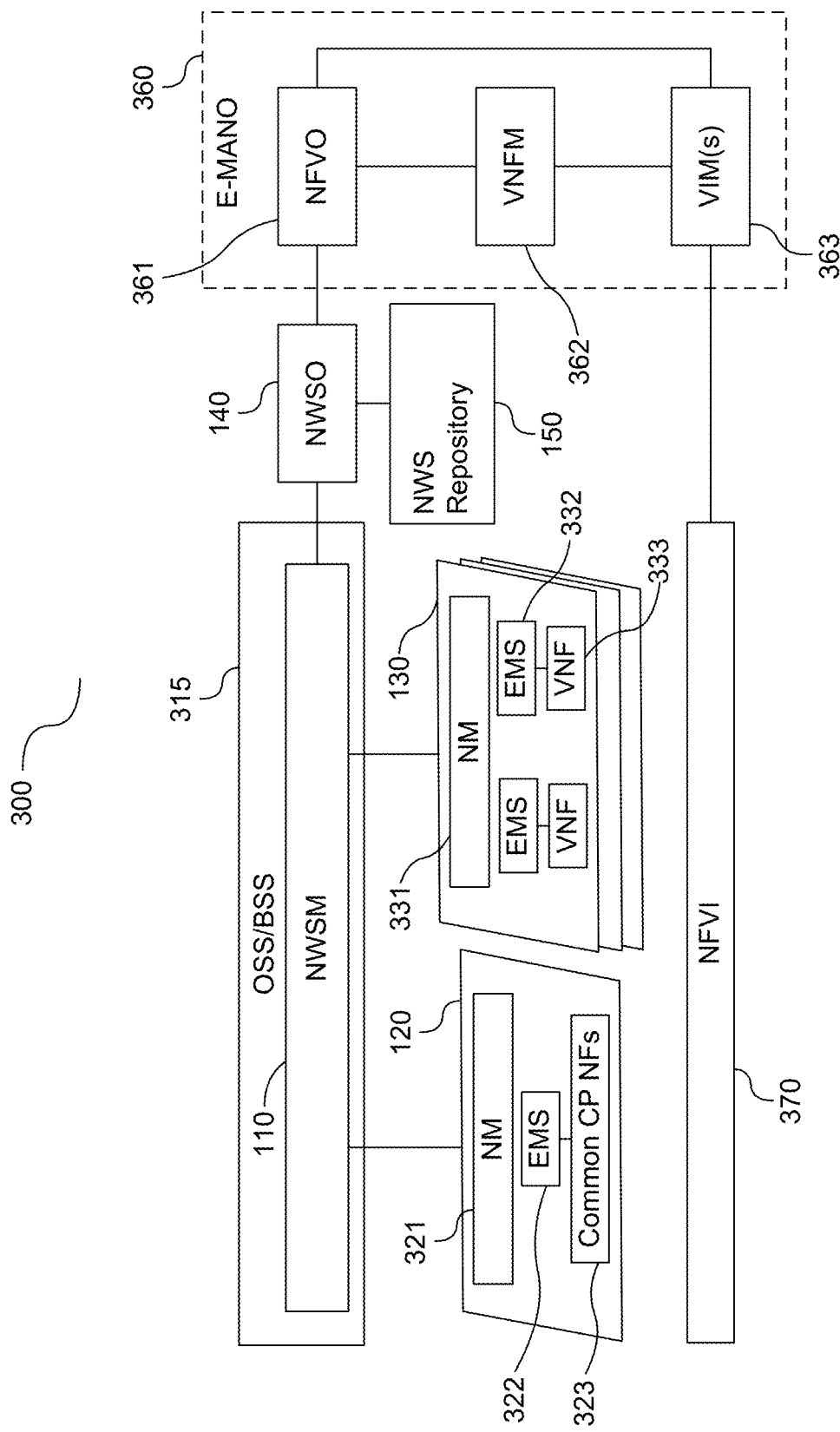
FIG. 3 illustrates an overview of an example of the network slice management and orchestration architecture in more detail.

FIG. 3 illustrates an overview of an example of the network slice management and orchestration architecture 100 in more detail 300. The NWSM 110 may be implemented as a part of an operational support system/business support system (OSS/BSS) 315. The common CP subnetwork 120 includes a network manager (Common NM) 321, an element management system (Common EMS) 322, and CP network functions (common CP NFs) 232 that may be shared across a plurality of slices. A network slice specific subnetwork 130 includes one or more network slice EMS 332 connected to a virtual network function (VNF) 333. The NWSO 140 is connected to an enhanced NFV management and orchestration (E-MANO) system 360. The E-MANO 360 includes a network function virtual infrastructure (NFVI) 361, a virtual network function manager (VNFM) 362 and a virtual infrastructure manager (VIM) 363. The VIM 363 is connected to a network function virtual infrastructure (NFVI) 370.

The OSS/BSS 315 includes management plane systems/applications that a service provider used to operate its business. These may include charging, accounting, and other such network management functions.

The Common NM 321 can comprise one or more network management functions for the common CP subnetwork 120. The Common EMS 322 manages elements used by the common CP subnetwork 120. The common CP NFs 323 comprises a collection of network functions used by the common CP subnetwork 120. It should be understood that the functions referred to as common, are usable by more than one network slice. It is not required that any one common function is common to (i.e., shared by) all network slices, nor is it required that any common function be used by more than one slice at all times.

The slice specific NM 331 comprises one or more network management functions for the slice specific CP subnetwork 130. The slice specific EMS 332 manages (physical network function (PNF) and/or VNF 333 functions used by the slice specific CP subnetworks 130. Each VNF 333 can correspond to a set of functions enabling the operation of a communication network. For example, a VNF 333 can provide the functions of a router, switch, gateway, firewall, load balancer, server, and the like. As noted above, the function is virtualized in the sense that it may utilize a set of virtual resources (i.e., from a single pool of physical resources, allocations of the storage, processing and networking connectivity may be presented as virtual processors, storage and networking interfaces). While dedicated hardware may be used for each function, virtual representations of the physical function in each slice may be created. As such, VNFs 333 may be instantiated on an as-needed basis using available virtual resources.

The Common NM functions 321 are responsible for the lifecycle management of multiple network slices (e.g., scaling in/out of the NFs within the common CP subnetwork). The slice specific NM functions 331 are responsible for the lifecycle management of a single slice (e.g. scaling in/out of the NFs within the slice specific subnetwork). In alternative embodiments, the Common NM functions 321 and slice specific NM functions 331 can be separate NM functions or they can be a part of the same NM function.

In some aspects, the VNFs 333 may be instantiated across a plurality of processing elements, at least two of which are at different physical locations. Accordingly, the VNFs 333 may "extend" across multiple physical processing elements in a coordinated fashion.

The E-MANO 360 can be used to instantiate the necessary network functional components in order to suitably provide the service identified by a network service request.

The NFVO 361 may be considered as analogous to a resource orchestrator (RO). The NFVO 361 may perform a number of functions related to the allocation of services to slices. The NFVO 361 can determine the Point of Presence (PoP) at which each VNF instance is to be instantiated. Further, the NFVO 361 may be responsible for reserving resources (e.g. compute, storage and network/connectivity resources) through, or transmitting instructions to reserve resources through the appropriate VIMs 363. The NFVO 361 also interacts with the VIM 363 and VNFM 362 to instantiate the VNFs. The NWSO 140 communicates with the NFVO 361 to allocate resources for each network slice. The NFVO 361 may be configured to coordinate, authorize, create and modify the network slices by interaction with the VIM function 363. In the interaction between the NFVO 361 and the VIM function 363, the NFVO 361 sends requests to the VIM function 363 and the VIM function 363 sends responses back to the NFVO 361. The NWSO 140 may be further configured to create an end-to-end network slice by interaction with the NFVO 361. In the interaction between the NWSO 140 and the NFVO 361, the NWSO 140 sends requests to the NFVO 361 and the NFVO 361 sends responses back to the NWSO 140.

The VNFM 362 may be configured to manage the operation and lifecycle of VNFs 333. For example, the VNFM 362 may create, maintain and terminate VNF 333 instances, which can be installed on virtual machines that are created and managed by the VIM 363. The VNFM 362 may also be configured to provide fault, configuration, accounting, performance and security management (FCAPs) for the VNFs 333. In addition, the VNFM 362 may be configured to scale-up and scale-down, one or more of the VNFs 333, which can result in increasing and decreasing the usage of the processor at a physical node upon which the VNFs 333 are instantiated. The VNFM 362 may also be scale VNFs in and out, which results in the instantiation or termination of a VNF instances. Each VNFM 362 may manage a separate VNF 333 or a single VNFM 362 function may manage multiple VNFs 333.

The VIM(s) 363 may be configured to manage the NFVI 370. There may be a plurality of VIM 363 functions within a particular network making use of this NFV architecture. Each VIM 363 function in the network can be responsible for the management of its respective NFVI 370. The VIM 363 may be able to keep track of the network slice ID (NWS ID) and the resource allocation quota assigned to the network slice. The quota specifies compute, storage and networking resources. It may also include access radio resources.

The NFVI 370 may include physical infrastructure, virtual resources and software resources in an NFV environment. For example, physical infrastructure may include servers, storage devices and the like and virtual resources may include virtual machines.

Figure 4:
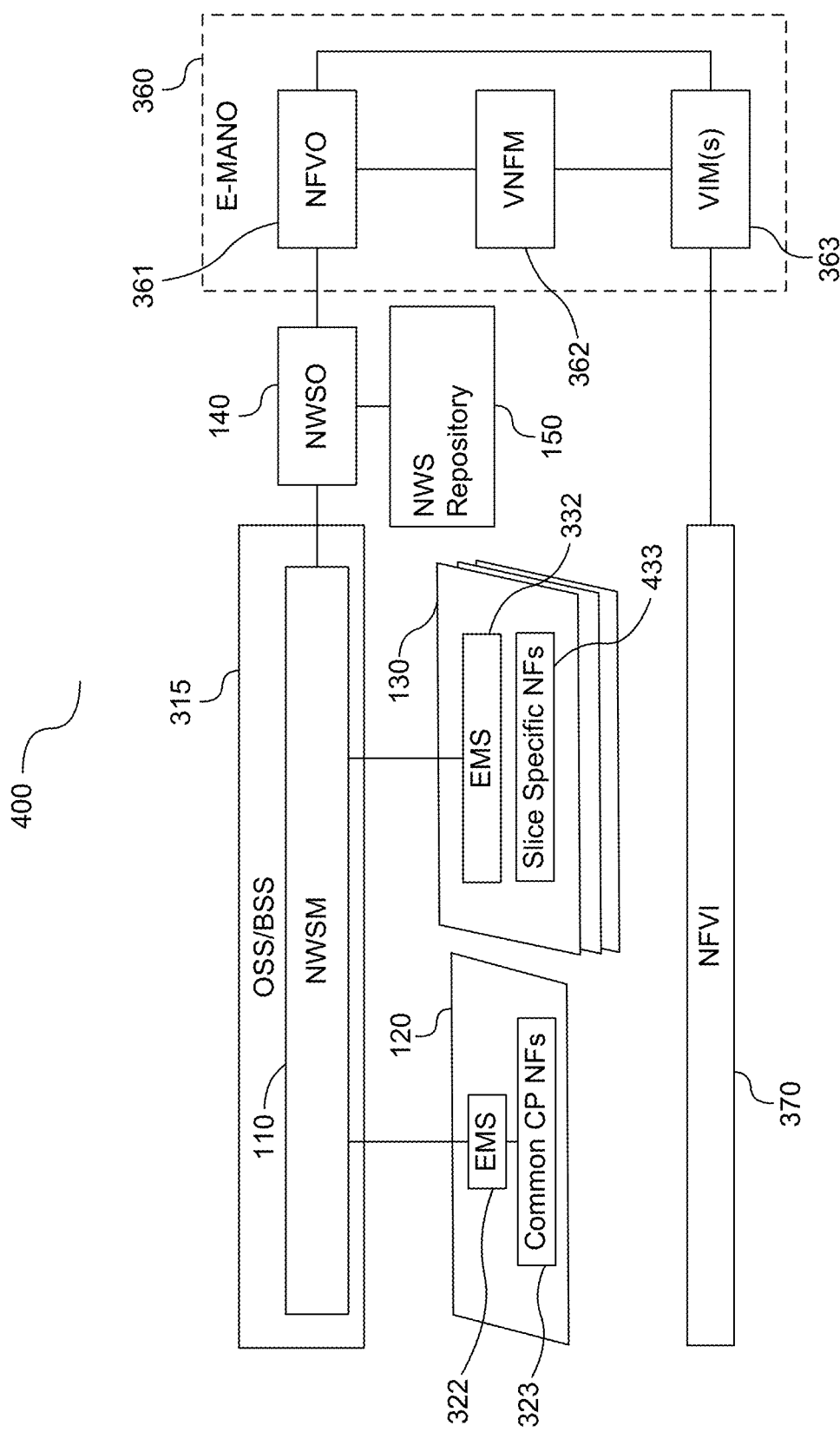
FIG. 4 illustrates an overview of another example of the network slice management and orchestration architecture in more detail.

FIG. 4 illustrates an overview of another example of the network slice management and orchestration architecture 100 in more detail 400. The architecture 400 comprises the OSS/BSS 315 that includes the NWSM 110, the NWSO 140, NWS repository 150, E-MANO 360 that includes the NFVO 361, VNFM 362 and VIM 363, and the NFVI 370. The common CP subnetwork 120 includes the Common EMS 322 and the common CP NFs 323. The slice specific subnetworks 130 includes the slice specific EMS 332 and a slice specific NFs 433.

In this example, the Common NM 321 and the slice specific NM 331 functions are not standalone functions, and instead are located in the NWSM 110. Also, this example shows how each slice may have one slice specific EMS 332 that manages a collection of VNFs 333 in a slice specific NFs 433. The slice specific NFs 433 are the network functions that are located on the individual network slices to provide UP functionality, and optionally some CP functionality specific to the individual network slice.

Figure 5:
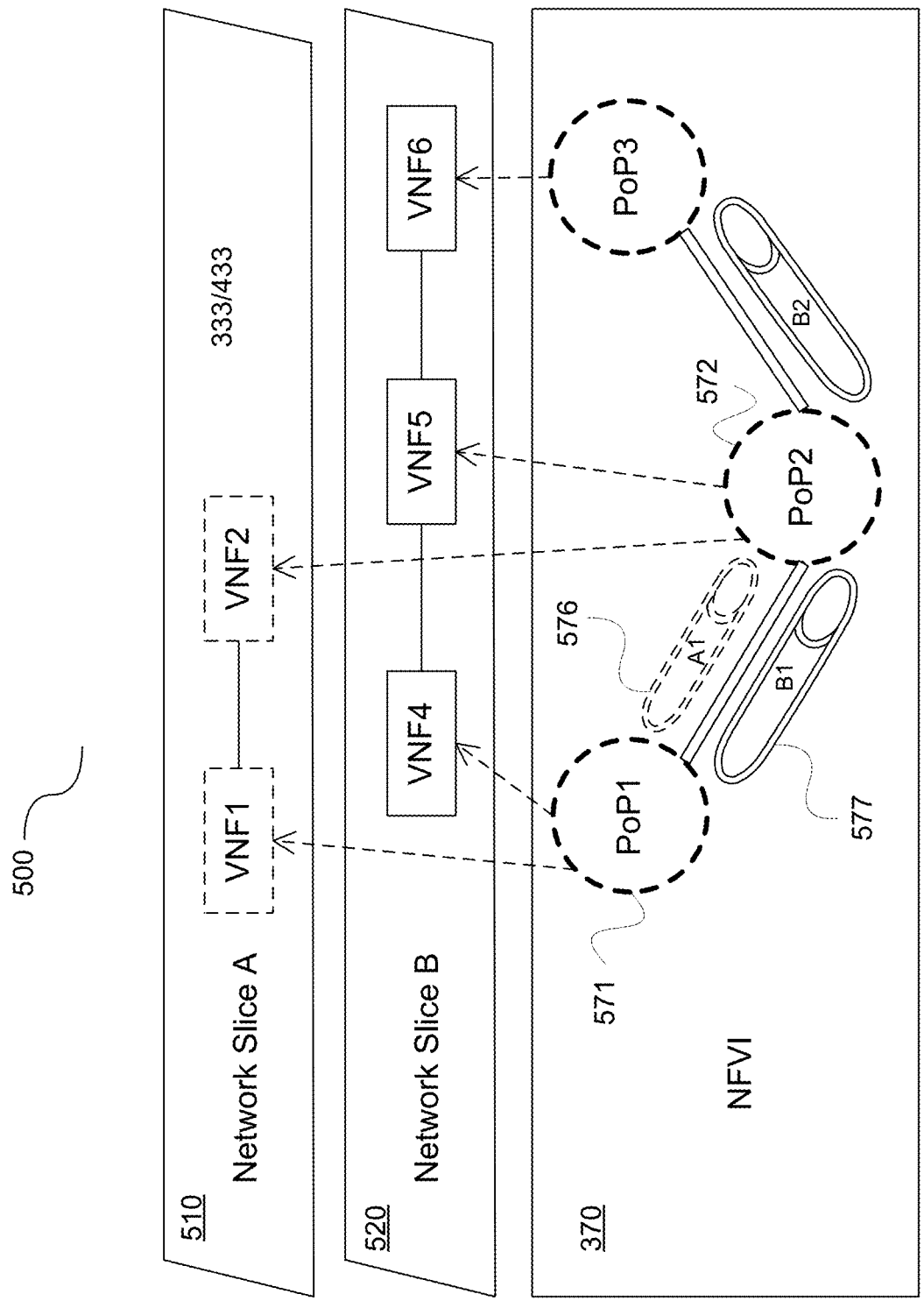
FIG. 5 schematically illustrates logical resources within physical network elements allocated to different slices.

Dedicated resources (e.g., compute, storage and networking) may be allocated for each network slice. While referring to "dedicated" resources, it should be appreciated that the terms "separated" or "isolated" can also be used. It should be further appreciated that physical network elements can still be shared between slices, but logical resources within those elements can be allocated to different slices (for example by having a physical element represented in different slices as a virtualized version of the element having only the resources and capacities allocated to the slice). FIG. 5 provides a schematic illustration 500 of such an allocation. Here NVFI 370 with POP1 571 and POP2 572 are shared with network slices A 510 and B 520. Specifically, POP1 571 provides the resources used to instantiate VNF1, which is an element within slice A 510, and VNF4, which is an element within slice B 520. Similarly, POP2 572 hosts VNF2 in slice A 510 and VNF5 in slice B 520. Network resources can be dedicated to a network slice to guarantee a minimum bit rate. This is conceptually similar to the creation of a dedicated bearer in a fourth generation (4G) network such as one that conforms to the Long Term Evolution (LTE) standards. Accordingly, resources can be reserved for each slice, such that logical link A1 576 is allocated for communication between VNF1 and VNF2 within slice A 571, whereas logical link B1 577 is allocated for communication between VNF 4 and VNF5 in slice B 520. A logical link represents a dedicated virtual path/link per slice.

Figure 6:
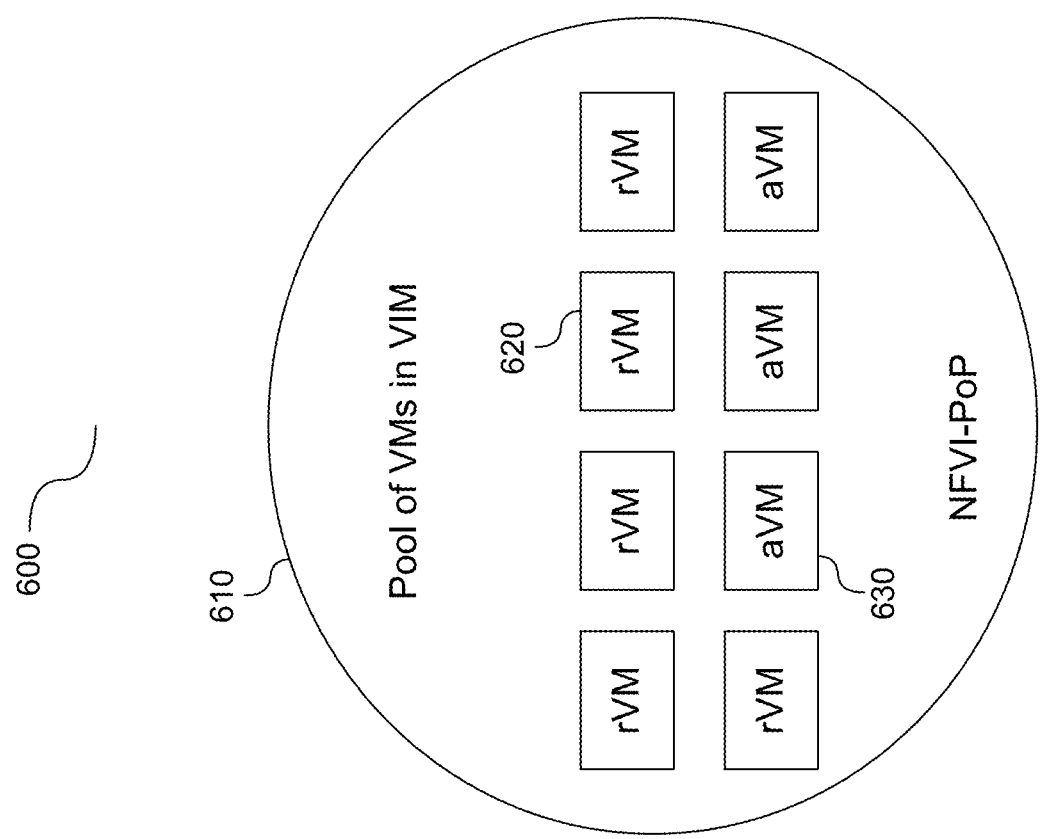
FIG. 6 schematically illustrates pools of virtual machines within a NFVI-PoP managed by a VIM.

In addition to network connectivity resources, compute and storage resources can be allocated to specific slices. For example, a minimum amount of resources may be dedicated to a slice, and additional resources can be allocated if available. FIG. 6 is a schematic illustration 600 of a pool 610 of virtual machines (VMs) within a NFVI-PoP managed by a VIM 363. Compute and storage resources can be reserved for a network slice at one or more VIMs 363. When a resource is reserved, it cannot be allocated to, or used by, another network slice. Accordingly, the reserved VMs (rVMs 620) are VMs that have been dedicated to a slice, and represent resources that are unavailable to other slices. A network slice may use more VMs than the reserved amount up to an assigned quota. The quota is typically not guaranteed and not reserved. However, the quota may be requested and, if available, allocated to the slice. In this example, there are three additional VMs available (aVMs 630), for allocation to a slice. One or more VMs are allocated for each VNF in forwarding graph(s) (FG(s)) for each network slice.

Figure 7:
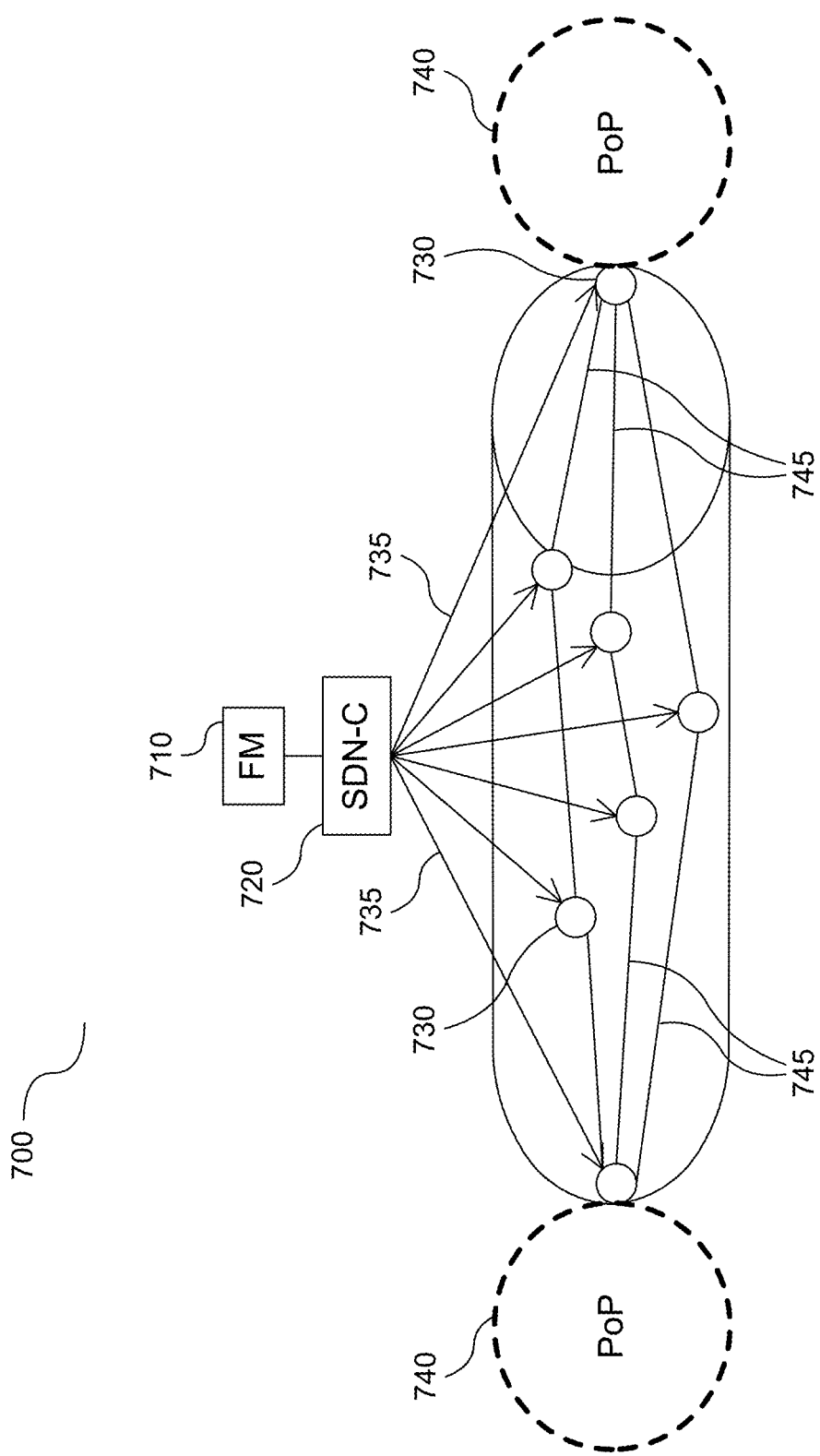
FIG. 7 illustrates how dedicated networking resources can be composed of multiple physical paths.

FIG. 7 is an illustration 700 of how dedicated networking resources can be composed of multiple physical paths according to an embodiment of the present invention. The dedicated networking resources may comprise multiple physical paths 735,745. A network slice specific flow manager (FM) function 710, in conjunction with the SDN controller (SDN-C) 720, allocates flows from a slice onto multiple physical paths 735,745. For example, the SDN-C 720 sends CP messages to intermediate nodes 730 via paths 735. Data plane messages between PoPs 740 are sent via paths 745. It should be appreciated that the intermediate nodes (e.g., routers) 730, and their capacity, can be shared between slices. However, a reserved bit rate is guaranteed for the slice. If there is no other traffic from other slices then the throughput may be higher, but in some embodiments the allocated network resources cannot exceed the assigned quota for the network slice.

Figure 8:
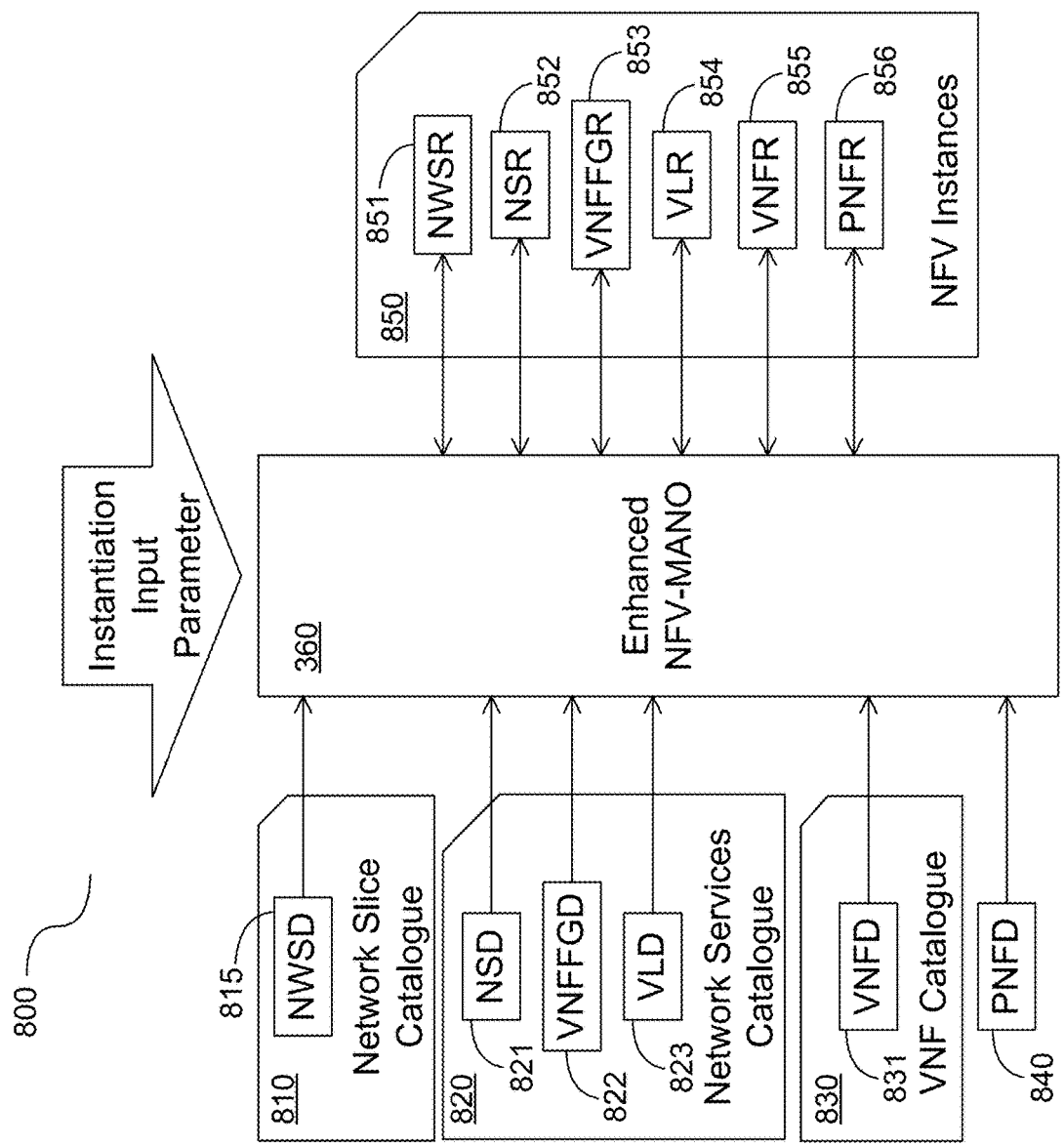
FIG. 8 illustrates network slice information elements.

FIG. 8 provides an illustration 800 of network slice information elements. The network slice descriptor (NWSD) 815 represents a template for a network slice. The NWSD 815 may be part of a network slice catalogue (NWSC) 810, which comprises templates for predefined network slices that are described using a NWSD 815. Alternatively, the NWSD 815 may be part of a network services catalogue which includes a network service descriptor (NSD) 821 which is a deployment template for instantiating the network service. The NSD 821 contains a virtual network function forwarding graph (VNFFG), which defines the set of network functions that are required to provide the requested service. The VNFFG contains a network forwarding path (NFP) that defines a sequence of actions that are to be performed, for example by a collection of VNFs 333, to provide the requested service. The network services catalogue may also include a VNFFG descriptor (VNFFGD) 822 and a virtual link descriptor (VLD) 823. Both catalogues provide input parameters to the E-MANO 360. To facilitate faster instantiation, the basic network slices can be preconfigured with the network services that are supported by the network slice. The NWSD 815 provides a set of identifiers which describe a slice or point to a location where slice information can be obtained. A PNF descriptor (PNFD) 840 and a VNF catalogue 830 including a VNF descriptor (VNFD) 831 may also provide input parameters to the E-MANO 360. The E-MANO 360 may also access NFV instances 850 in the form of a collection of repositories including a network slice repository (NWSR) 851, a network service repository (NSR) 852, a VNFFG repository (VNFFGR) 853, a virtual link repository (VLR) 854, a VNF repository (VNFR) 855 and a PNF repository (PNFR) 856.

The NWSD 815 may include a network slice ID (NWS ID), a network slice type (e.g., MBB, Ultra Reliable Low Latency (URLL), etc.) and a NFV instances repository ID (i.e., extending the ETSI NFV definition to a separate repository for each network slice). The NFV instances repository contains a list of all VNFs 333 and network services (i.e., list of NWS IDs) that are instantiated within the slice. Alternatively, the existing NFV instances repository can be extended to indicate the associated network slice. The NWSD 815 can further indicate a resource reservation information element (IE) for compute, storage and network. The resources are committed to the network slice but only allocated when there is an instantiation request. The resource reservation may be performed by the NWSO 140. The NWSD 815 may further indicate resource quotas IE for compute, storage and network. The resource quota IE may include the maximum number of VMs a slice is allowed or a percentage of the resources allowed in a VIM, such as VIM 363. The resource quotas may be allocated by the NWSO 140. The VIM 363 ensures that the resource quotas are not violated when allocating resources.

Figure 9:
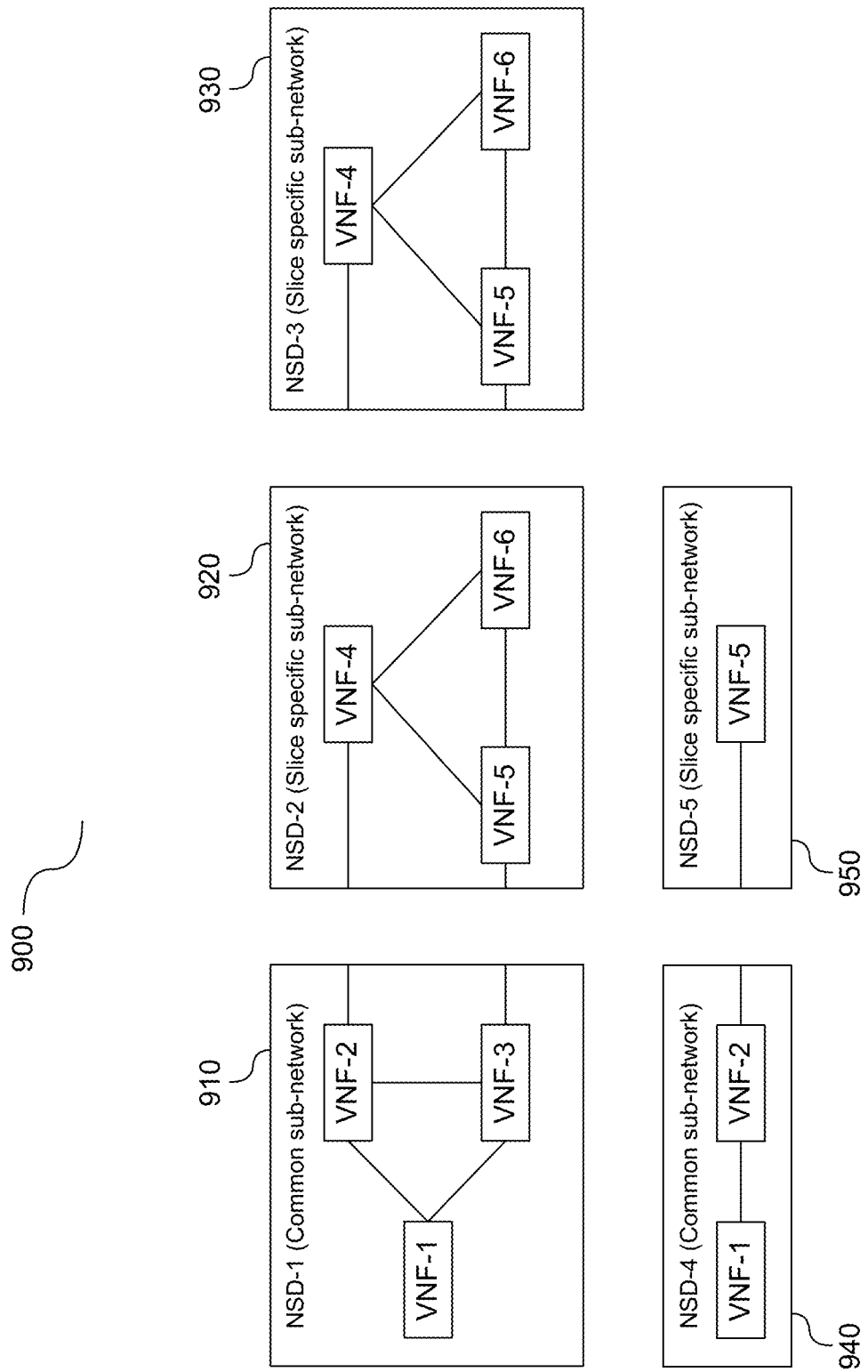
FIG. 9 illustrates examples of network slice subnetwork components.

FIG. 9 shows a collection 900 of exemplary network slice subnetwork components. Each network slice component 910, 920, 930, 940, 950 includes one or more VNFs and connections among the VNFs. Network service descriptor 1 (NSD-1) 910 and NSD-4 940 are examples of common CP subnetworks. NSD-2 920, NSD-3 930 and NSD-5 950 are slice specific subnetworks. A network slice comprising one of the common CP subnetworks and one of the slice specific subnetworks may be instantiated.

Figure 10:
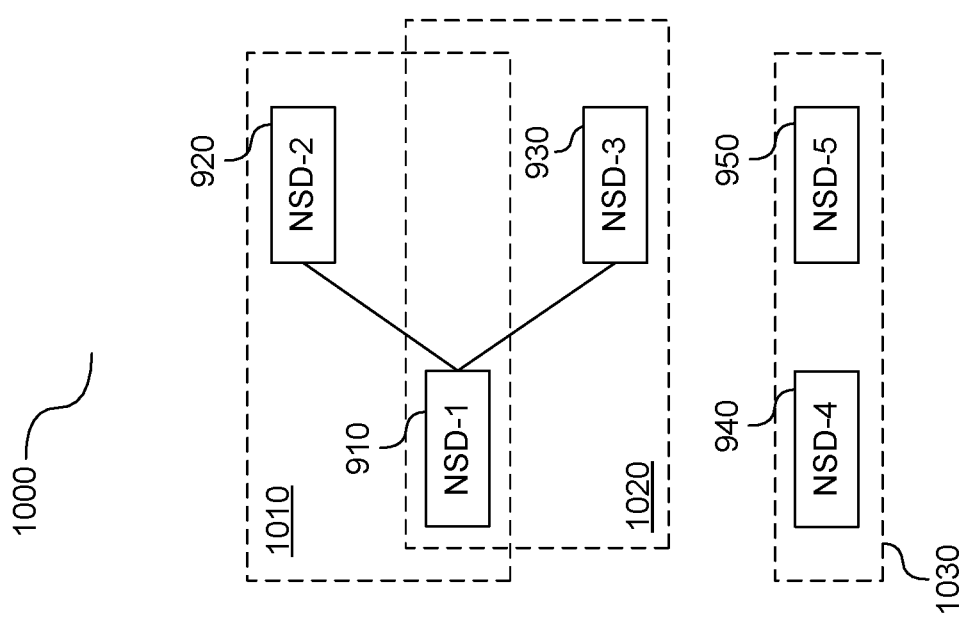
FIG. 10 illustrates examples of network slices.

FIG. 10 shows examples of a network slice 1000, in accordance with the network slice components of FIG. 9. Network slice 1010 comprises NSD-1 910 and NSD-2 920. Network slice 1020 comprises NSD-1 910 and NSD-3 930. Both network slices 1010 and 1020 share common CP subnetwork NSD-1 910. Network slice 1030 comprises NSD-4 940 and NSD-5 950.

FIG. 11 illustrates an example of a NWSD information element (IE) 1100. The NWSD IE includes a list of element identifiers and their descriptions. For example, NWSD IE 1100 includes a NWS ID, a Common subnetwork described by a network service ID (NSD), a slice specific sub-network described by a NSD, a Common subnetwork endpoint and a slice specific subnetwork endpoint. If no network slice has been instantiated, then for the network slice 1010, the NWSO 140 would instantiate the common CP subnetwork 910 and the slice specific subnetwork 920. For network slice 1020, if network slice 1010 is already instantiated, then the common CP subnetwork 910 may be updated and the second slice specific subnetwork is instantiated. The update for the common CP subnetwork 120 may include increasing the resources that are allocated to the NFs in the common CP subnetwork 120 (i.e., scale-up procedure defined in ETSI NFV) to accommodate the additional traffic on the new slice.

FIGS. 12A and 12B illustrate an alternative example for an NWSD IE. The NWSD IE 1210 of FIG. 12A shows a NWS ID and a network slice forwarding graph (NWSFG) ID. FIG. 12B shows an example of the NWSFG IE 1220 referenced in the NWSD IE of FIG. 12A. The NWSFG IE includes a NWSFG ID, a NSD that describes the common subnetwork and a slice specific NSD that describes the slice specific subnetwork.

FIG. 12C illustrates, in an IE chart, another example of a NWSD 1230. The NWSD IE of FIG. 12C shows an id for the ID of the network slice descriptor, a type for the network slice type (e.g. MBB, URLL, etc.), one or more NSDs which is part of this network slice, a res_reservation which represents the required resources to be reserved (percentage or amount) for this network slice type (may be per VIM), and a res_quota which represents the resource quota (percentage or amount) for this network slice type (may be per VIM). The cardinality shows that there is only one element for each IEs except for the NSD.

FIG. 12D illustrates, in an IE chart, an example of a network slice instance record 1240 corresponding to the NWSD IE of FIG. 12C. The record of FIG. 12 D shows an id for the ID of the network slice instance, a type for the network slice type (e.g. MBB, URLL, etc.), one or more network service records (NSRs) which are part of this network slice, a res_reservation which represents the resources reserved for this network slice instance (may be per VIM), and a res_quota which represents the resource quota for this network slice instance (may be per VIM). The cardinality shows that there is only one element for each IE except for the NSR.

Network slicing provides customized treatment for different services with diverse QoS requirements given a common physical set of network resources. In network slicing, resources are to be allocated such that services supported by one slice are not negatively affected by services supported by other network slices. In order to avoid a negative effect of one slice on the other slices, resource isolation among network slices may be enforced. Isolation among network slices can be achieved through proper resource allocation among network slices by configuration management. The management support for network slice resource isolation can provide independent, scalable, modularized operation of different network slices; and can reduce operational complexity.

A physical resource may be defined as a physical asset for computation, storage or transport including radio access. A logical resource may be defined as a partition of one or a group of resources. Thus, according to these definitions, the network slice resources comprise of physical and logical resources. Accordingly, the isolation among network slices can be at the level of physical resource or logical resource.

There may be different types of network slice resource isolation. Computation/storage type isolation means isolation on computation/storage resources level which may include but not limited to CPU, memory, hard disk, etc. In addition to computation/storage type isolation, resource isolation can be enforced at the transport level. Transport resources may include but not limited to virtual network identifiers, IP address assignment, forwarding labels, ingress traffic filters, traffic policing and shaping parameters, etc.

If strict isolation is required for a slice (e. g., for reasons such as security for services supported by the slice) the resources that are allocated for the slice should not be used by other slices. Such level of isolation can be achieved through "physical isolation" of network resources among slices. For example, the computation/storage resources for different network slices may be deployed (allocated) at different network nodes. A less strict level of resource isolation is "logical isolation", where the resources can be shared by different slices. However, the amount of provisioned resources at the node is sufficiently large such that the performances of network slices can still be deemed as independent. Resource isolation may be achieved at different granularities. For example, computing resources can be isolated at the computing node level or at the CPU core level within one computing node. In a virtualized environment, affinity and anti-affinity rules can be used by the management system to achieve proper granularity for resource isolation.

Network computation/storage resources can be allocated to NFs according to estimated computation/storage demands of services within each slice (i.e., infrastructure layer isolation). This equally applies to NFs that are common for some slices or slice-specific NFs. Such resource allocation can be realized through the ETSI NFV MANO architecture.

In addition to computation/storage level isolation, resource isolation can be enforced at the transport level (i.e., application layer isolation). Transport network resources may include virtual network identifiers, IP address assignment, forwarding labels, ingress traffic filters, traffic policing and shaping parameters, etc. The NWSM 110 determines transport resource for each network slices according to SLAs and available transport resources and configures the related slice-specific network functions through policies. As an example, the policy can indicate to a network function to limit the slice traffic entering certain nodes or to limit the slice traffic traversing a given link, etc.

Figure 13:
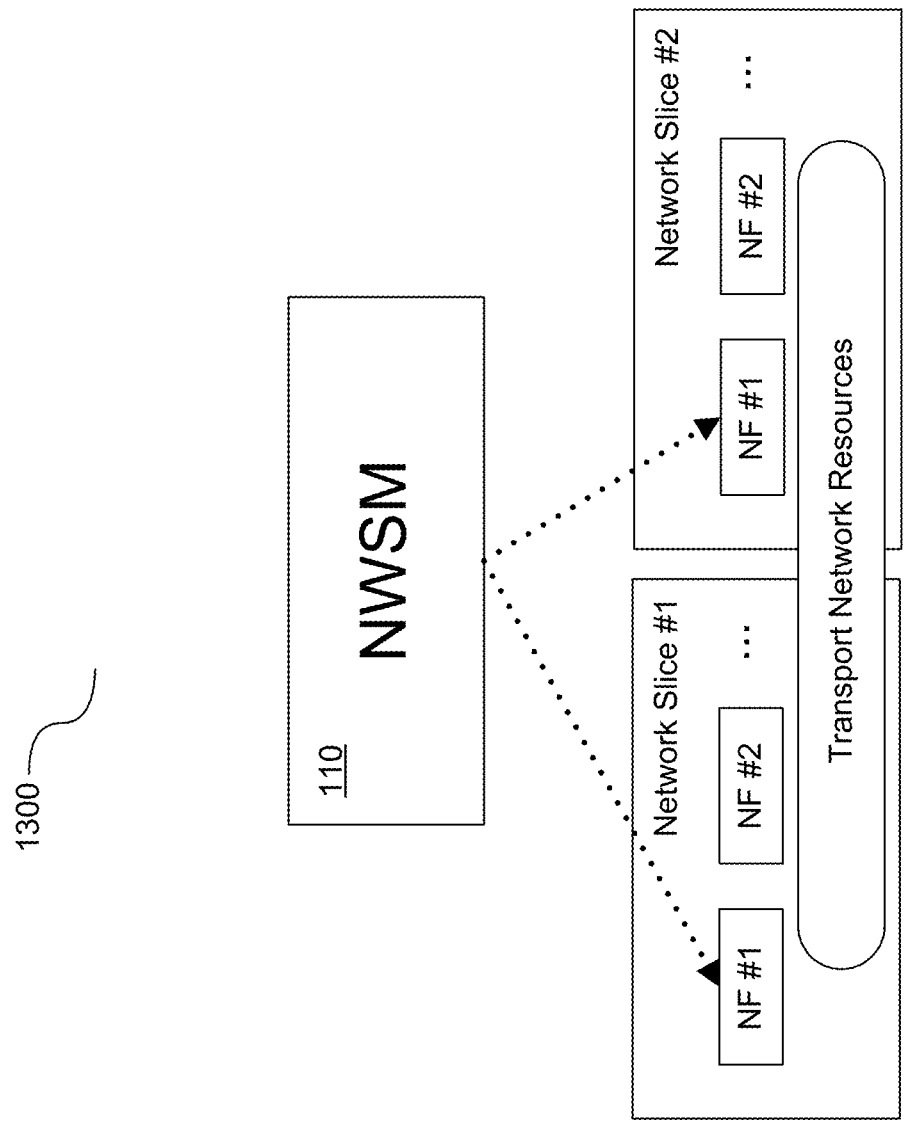
FIG. 13 illustrates, in a component diagram, an example of policy configuration of slice specific NFs by the NWSM.

FIG. 13 illustrates, in a component diagram, an example of policy configuration 1300 of slice specific NFs 433 by the NWSM 110. The policy function can be configured by the NWSM 110 to achieve proper transport resource isolation among network slices. For example, the policy function can define a maximum aggregated bit rate for each slice.

Figure 14:
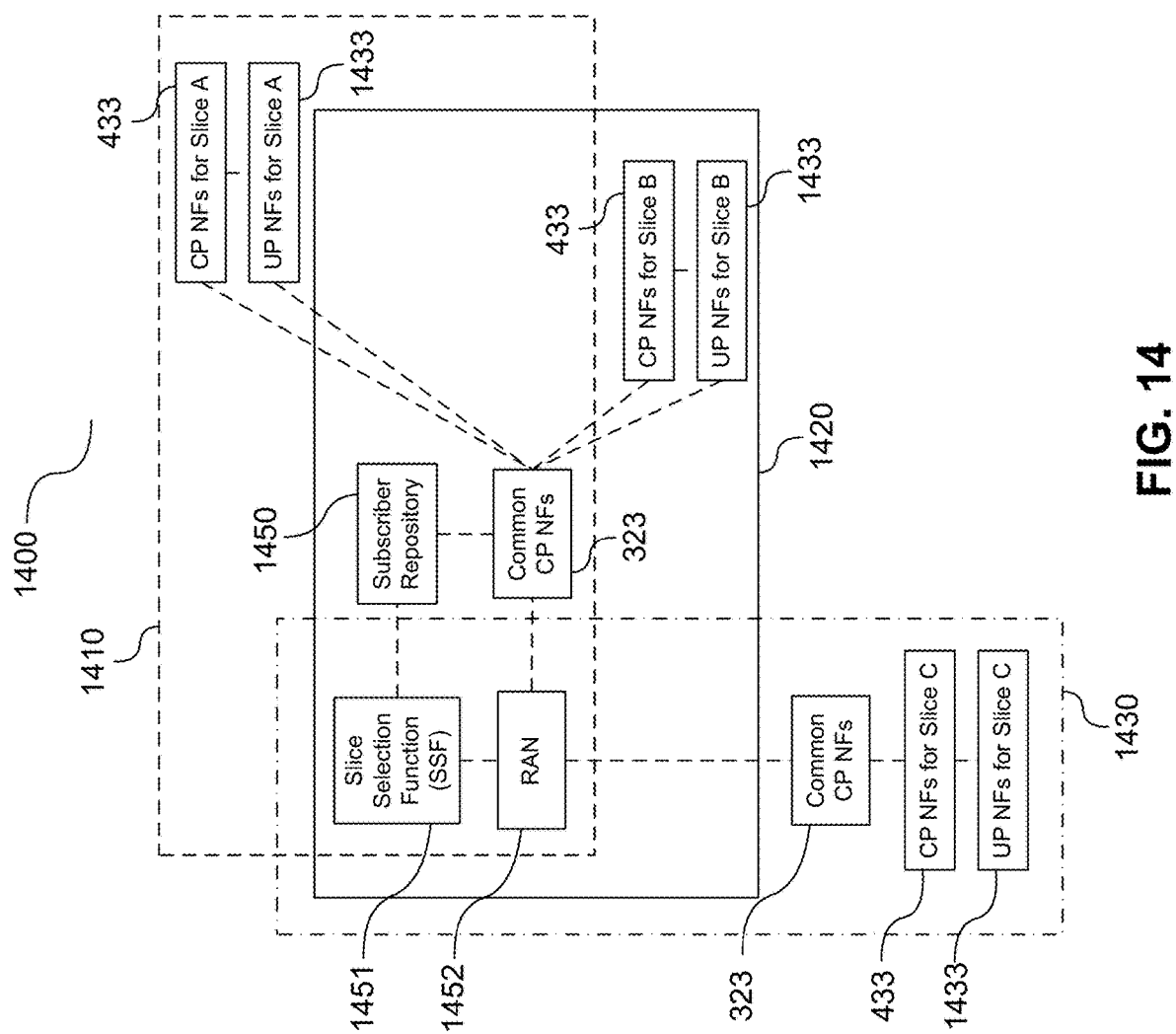
FIG. 14 shows an implementation for network slicing illustrating the control plane interfaces for network slicing with Common and slice specific functions.

Referring to FIG. 14, an implementation 1400 for network slicing illustrating the control plane interfaces for network slicing with Common and slice specific functions is presented. In the implementation, it is assumed that any slicing of a PLMN is not visible to the UEs at the radio interface. A SSF 1451 links the radio access bearer(s) of a UE with the appropriate core network instance, such that the RAN 1452 appears as one RAT+PLMN to the UE and any association with network instance is performed internal to the network, with the network slices being transparent to the UE. RAN internal slicing or managing of shared RAN resource is also possible.

Besides the subscriber repository function 1450, the control plane of the NextGen Core is partitioned into three types of NFs: a slice selection function (SSF) 1451, a common CP NF 323 and a slice specific NF 433.

A SSF 1451 handles the UE's initial attach request and new session request by selecting an appropriate slice for the UE based on the UE's subscription information, UE usage type, service type and UE capabilities. The SSF 1451 is not specific to a particular network slice. The NWSM 110 system provides the instantiated network slices to the SSF 1451. This can be performed individually by the NWSM 110 to the SSF 1451 though the EMS 322 of the SSF 1451 after each network slice instantiation, modification or termination request, or it can be performed via the network slice instance repository 150.

A common CP NF 323 is the CP entry function, which at least includes the MM function and NAS routing function. For Group B slices 1420, the common CP NF 323 are shared among different slices. When there are several slice CP NF 433 which share the same type of slice behind the common CP NF 323, the common CP NF 323 do the load balance selection. For Group A slices 1410, the common CP NF 323 are only linked to one special slice instance. The interaction between the common CP NF 323 and the subscriber repository 1450 function is routed via the common CP NF 323. In this example, there is no additional direct interface from RAN 1452 to the slice specific CP NFs 433. The SSF 1451 may be collocated with the common CP NFs 323.

Slice specific CP NF 433 are the CP NFs which are located on the individual slices and are isolated from other slices.

Each network slice instance is associated with a network slice type ID (NeS-ID). The NeS-ID is used to identify the type of the slice, e.g., eMBB, massive Internet of Things (mIOT). Both standardized and public land mobile network (PLMN) specific values for NeS-ID are possible. When the UE attaches to the network, the SSF 1451 determines which slice the UE should be allocated and provides the related NeS-ID to the UE. If the UE is able to simultaneously access multiple network slices, then more than one NeS-ID, one for each of the network slices, may be associated with the UE. All NeS-IDs may be returned to the UE. Alternatively, only one NeS-ID may be returned to the UE. Alternatively, some NeS-IDs may be returned to the UE. The NeS-ID may be the same as the NWS ID.

A temporary ID can be assigned to the UE when the UE is successfully registered to the network. The UE temporary ID may be assigned by the common CP NF 323. The UE temporary ID comprises the routing information to the common CP NF 323 and a UE-specific identity. If the UE is able to simultaneously access multiple network slices, the UE temporary ID may preferably be a common shared ID for simplicity, though multiple temporary IDs may be issued at the cost of additional complexity.

After the UE has been registered with a network slice instance, in an implementation the UE can be provisioned with two identities which may be used by the UE for accessing the network slice, a NeS-ID and a temporary ID. When the UE has a valid NeS-ID but the temporary ID is not valid in the camped area, the RAN 1452 forwards the request to the common CP NF 323 based on the NeS-ID. When the UE has a valid temporary ID in the camped area, the RAN 1452 forwards the request to the common CP NF 323 based on the temporary ID.

In order to avoid rerouting procedure, after the SSF 1451 selects the appropriate slice based on the information received from the UE in the attach request and profile information in the subscriber repository, in some aspects the SSF 1451 may directly forward the attach request to the common CP NF 323.

As network instances of the PLMN share radio access, access barring and (over)load control per slice should be separated. There may be CN resources that cannot be fully separated, e.g., transport network resources.

The SSF handles the UE's initial attach request and new service request by selecting an appropriate slice for the UE based the UE's subscription information, UE usage type, service type and UE capability. During the attach procedure the SSF 1451 associates the UE to one default slices and/or a UE specified type slice. The initial attach request is then forwarded to the selected network slice and handled by the CP NFs 323 in the selected network slice. During the attach process, the related NeS-ID and a temporary ID for the UE are provided to the UE in attach accept message.

The UP connections for the UE can be established by the selected CP NF 323. This can be established during the attach procedure or it can be setup after the UE sends a new service request. If it is established during the attach procedure, then a default or UE specified UP connection is setup. During the setup of UP connections, the NeS-ID may be sent to the RAN 1452 if the RAN 1452 need be slice aware.

After the attach procedure, a UE can be associated with multiple slices if the UE sends multiple new session requests for services that are provided by different slices.

Figure 15:
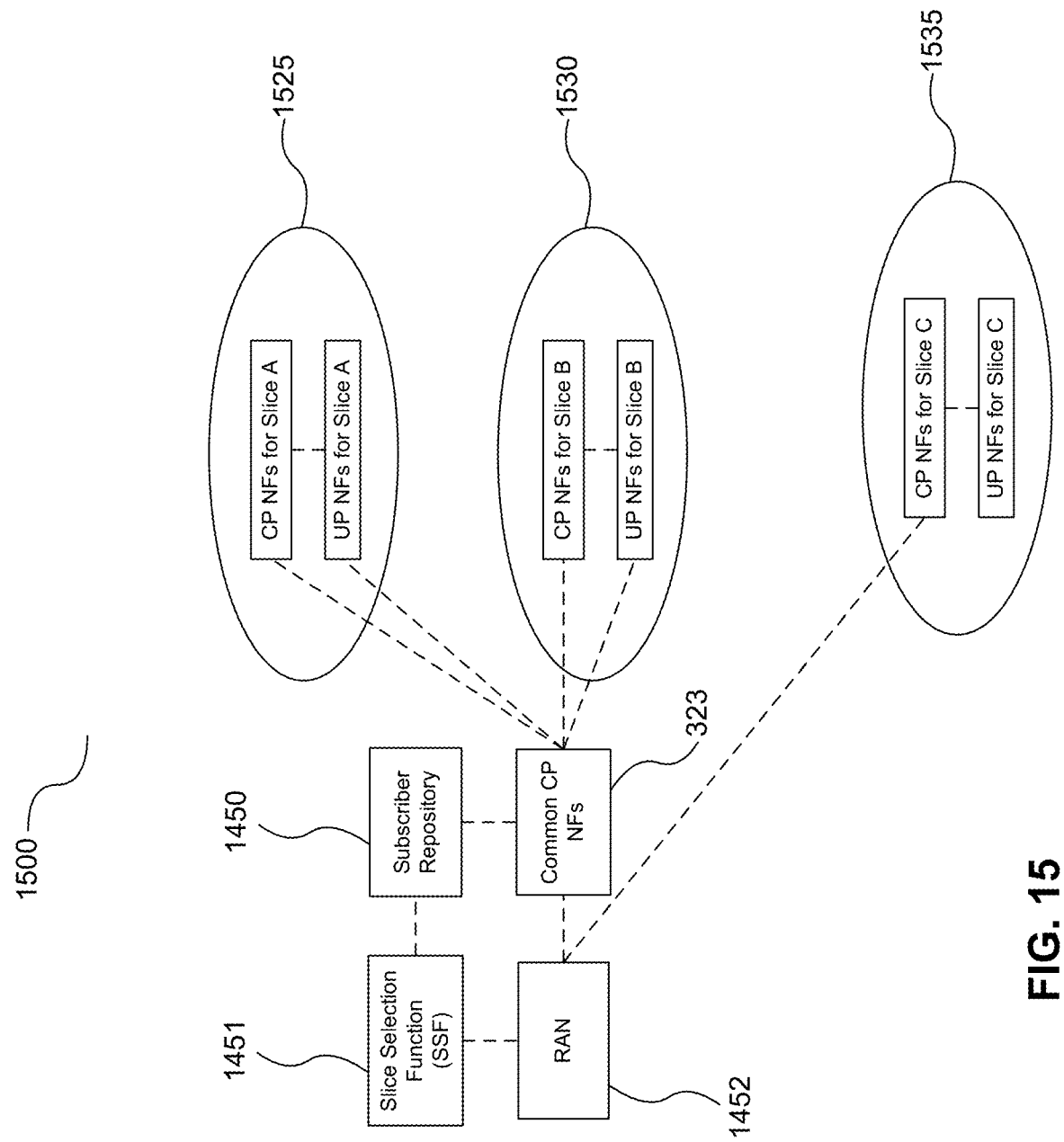
FIG. 15 illustrates, is a block diagram, control plane interfaces for network slicing with both Common and slice specific functions.

FIG. 15 is a block diagram illustrating control plane interfaces 1500 for network slicing with both Common and slice specific functions. Slice routing and selection may be provided to link the radio access bearer(s) of a UE with an appropriate core network instance. Slicing may be transparent to the UE.

As shown in FIG. 15, control traffic flows from the common CP NFs 323 to both the CP NFs 433 and the UP NFs 1433 for slice A 1525 and slice B 1530, while control traffic for slice C 1535 flows from the RAN 1452 to the CP NFs 433 in slice C 1535. In an aspect, for network slices that have a common CP NF 323, e.g., slice A 1525 and slice B 1530, an additional direct interface between the RAN 1452 and the slice specified CP NFs 433 is provided.

Each network slice instance (NSI) has a network slice instance ID (NSI-ID). For slices with common CP NFs 323 the NSI-ID may be a combination of a common CP NF ID and a slice specific ID. The NSI-ID may be the NWS ID. The slice selection function (SSF) 1510 can be provided in the RAN 1452, similar to existing networks in which an NAS node selection function resides in the RAN 1452. Alternatively, a core network provided function may perform the functions of the SSF 1451. The SSF 1451 selects an appropriate slice for the UE in accordance with information provided by the UE (and optionally by the CN). The SSF 1451 may be in communication with a subscriber repository 1450 which also provides a direct interface to the common CP NFs 323. The slice specific CP NFs 433 may interface with the common CP NFs 323, but may not have a direct interface with the subscriber repository 1450. Alternatively, the slice specific CP NFs 433 may have a direct interface to the subscriber repository 1450.

The SSF 1451 may be involved in an attach procedure, a new session request, overload control, and slice reselection. In the attach procedure, the SSF 1451 selects a slice for the UE during the initial attach procedure based on the UE's subscription information, UE usage type and service type (if provided). The SSF 1451 performs a UE identity check before a slice is selected (this function may be common to (i.e., shared by) all slices). The SSF 1451 may associate the UE with one default slice and/or a UE specified slice during the attach procedure. The SSF 1451 may perform the NNSF and send the selected CP NFIDs to the AN. Alternatively, it may select the NS and the AN performs the NNSF. In the new session request, the SSF 1451 may select additional slices for a UE after the initial attach request, and the new service request may be forwarded to the SSF 1451 by the common CP MM selected from the initial attach procedure. The overload control receives congestion control information from CN functions, determines the relevant slices to apply congestion control based on the congestion control policy, and checks the congestion information during the slice selection procedure. In slice reselection, the SSF 1451 receives an attach request and re-selects another slice for one of the following events: UE mobility and Slice instantiation, adaptation or termination.

Figure 16:
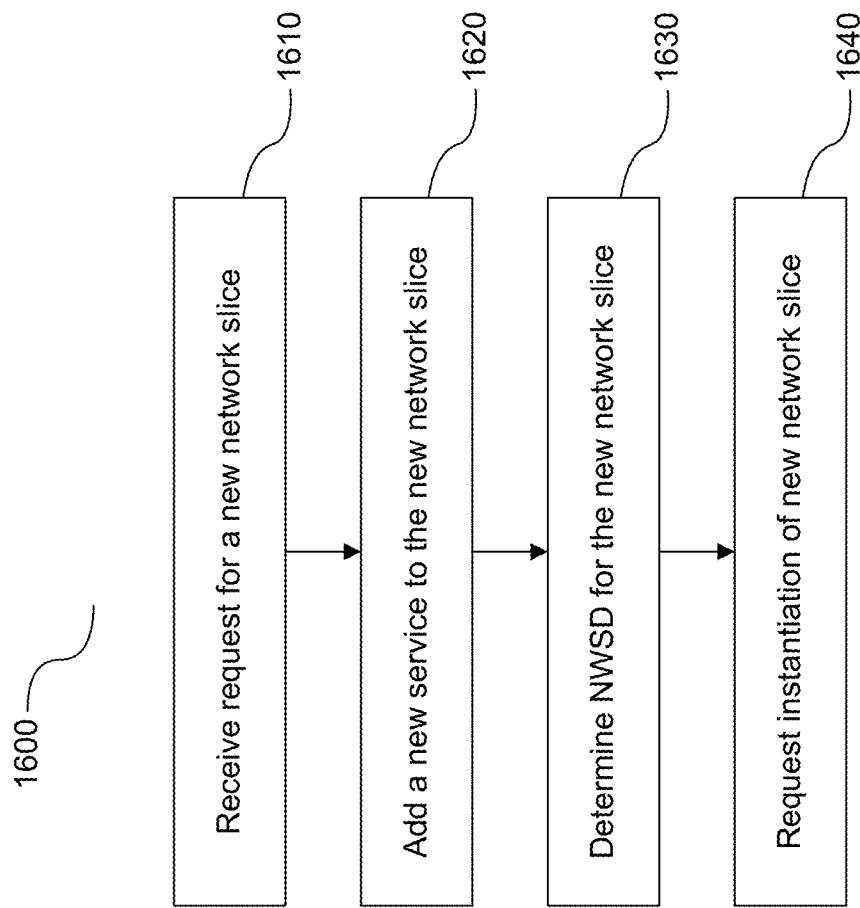
FIG. 16 illustrates, in a flowchart, a method for generating a network slice, in accordance with an embodiment of the present invention.

FIG. 16 illustrates, in a flowchart, a method (1600) generating a network slice, in accordance with an embodiment of the present invention. The method comprises the NWSO 140 receiving from a NWSM a request for a new network slice (1610), adding a new session to the new network slice (1620), determining a NWSD for the new network slice (1630), and requesting from the RO an instantiation of the network slice using the E-MANO (1640). Other steps may be added to the method (1600).

Figure 17:
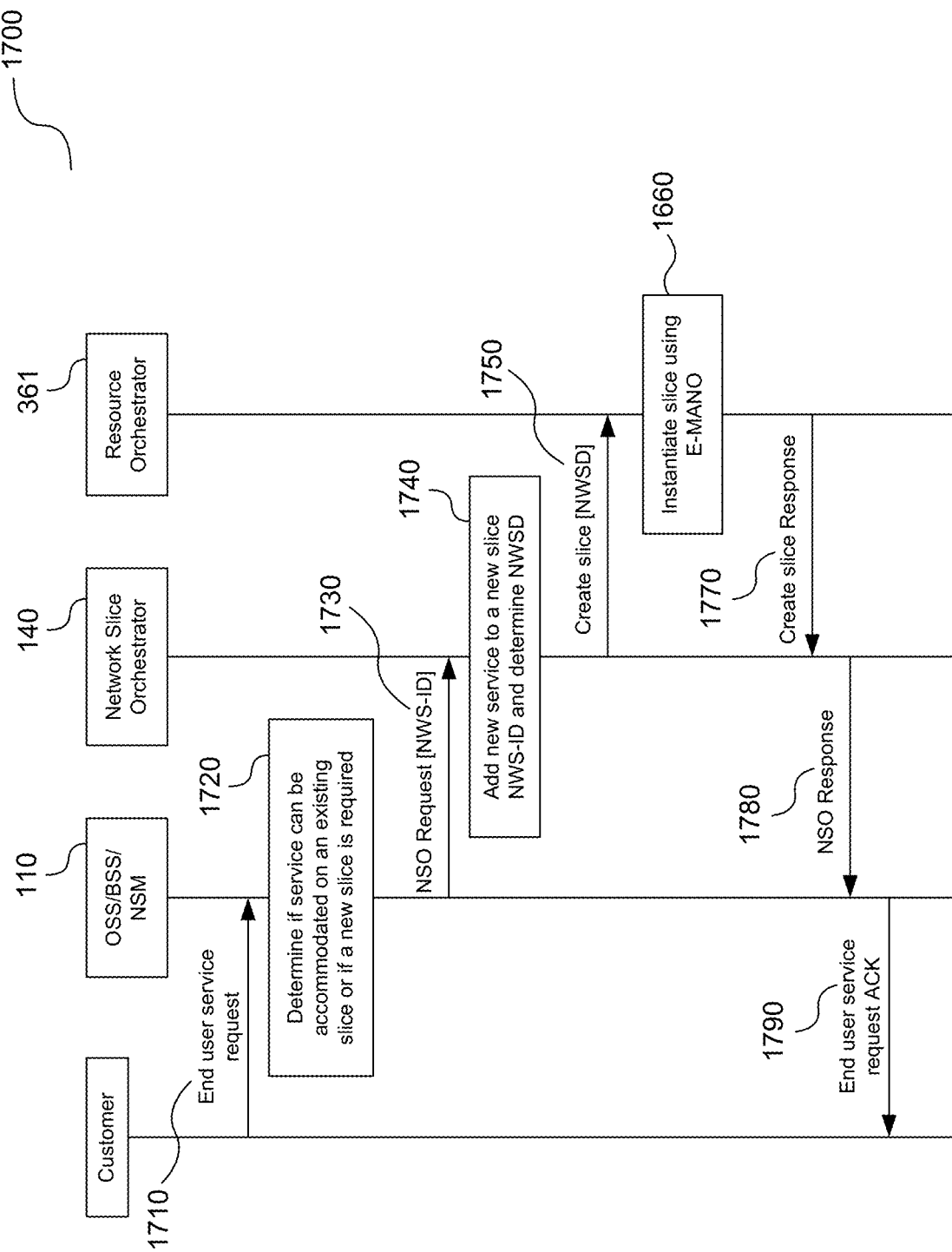
FIG. 17 illustrates, in a message flow diagram, a method of generating a network slice in more detail.

FIG. 17 illustrates, in a message flow diagram, a method (1700) of generating a network slice in more detail. A customer (i.e., service provider) sends a new end user service request to the NWSM 110 (1710). The NWSM 110 determines if the new end user service can be accommodated onto an existing slice or if a new slice should be created (1720). The decision takes into account the performance requirements for the new end user service. If a new slice is required, the NWSM 110 sends the request to the NWSO 140 (1730). The request may include the NWS ID of the new slice and a NSD that describes the slice specific sub-network 130. The NWSO is responsible for composing the network slice and creating a NWSD. The NWSO 140 performs service orchestration and determines if existing common CP NFs 120 can be used for the new network slice. The NWSO 140 determines the NWSD (1740) from the parameter included in the NSO Creation Request. After creating the NWSD, the NWSO 140 sends the NWSD to the RO in the E-MANO 360 (i.e., the NFVO 361) (1750). The E-MANO 360 instantiates the new functions onto the resources allocated for the new network slice (1760). The E-MANO 360 sends a Create Network Slice Response to the NWSO (1770). The NWSO 140 sends an NWSO Response to the NWSM 110 (1780). The NWSO 140 updates the NWS repository 150. The NWSM sends an ACK for the end user request (1790).

The NWSO 140 first determines if the new slice can use existing common CP NFs 120. If a suitable common CP NF 120 exists then the new slice specific NFs 130 may be configured to connect to the common CP NF 120. To determine if a service can be added to an existing network slice, the NWSO 140 checks to see if any existing network slice meets the requirements for the requested service. For example, if the customer service request is for fixed IoT devices then a common CP sub-network specific for fixed devices can be selected (i.e., the request may include the common CP sub-network type). Also, the NWSO 140 may check for functional type matches, i.e., if it receives a MTC request, it looks for a MTC slice.

Figure 18:
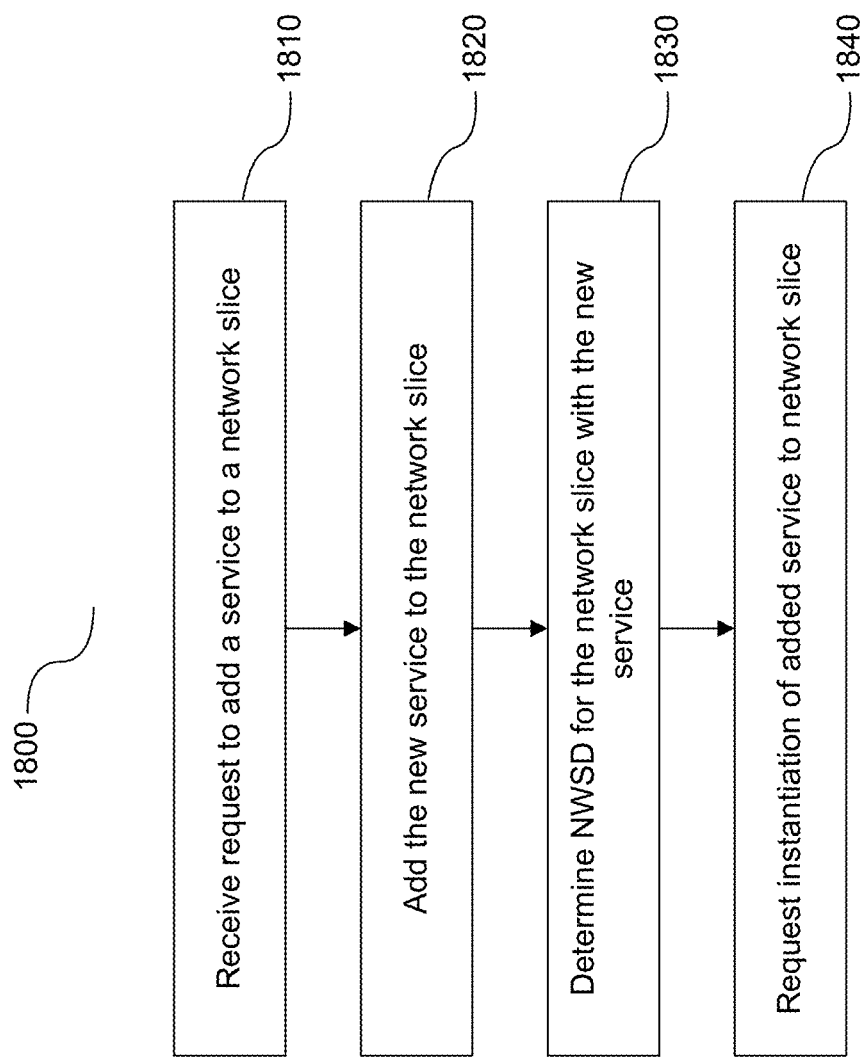
FIG. 18 illustrates, in a flow chart, a method of modifying a network slice, in accordance with an embodiment of the present invention.

FIG. 18 illustrates, in a flow chart, a method (1800) of modifying a network slice, in accordance with an embodiment of the present invention. The method comprises the NWSO 140 receiving from a NWSM 110 a request to add a new service to a network slice (1810). Next, the NWSO 140 adds the new session to the network slice (1820). Next, the NWSO determines a NWSD for the network slice with the added service (1830). Next, the NWSO 140 requests an RO to instantiate the added service within the network slice using E-MANO (1840). Other steps may be added to the method 1800.

Figure 19:
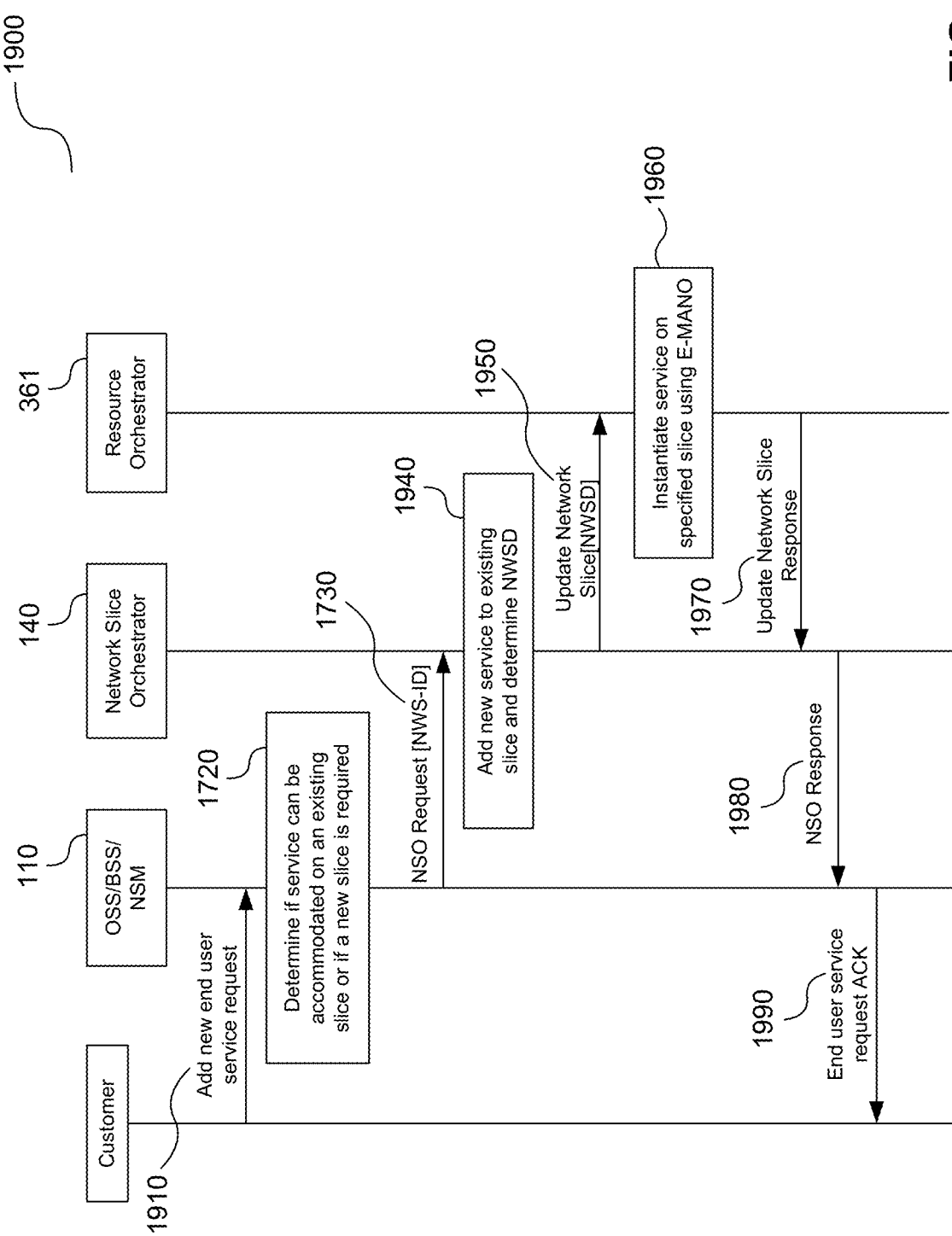
FIG. 19 illustrates, in a message flow diagram, a method of modifying a network slice in more detail.

A network slice modification request may be sent when a customer sends a new end user service request to the NWSM 110. FIG. 19 illustrates in a message flow diagram a method of modifying a network slice in more detail (1900). A customer (i.e., service provider) sends a new end user service request to the NWSM 110 (1910). The NWSM 110 determines if the new end user service can be accommodated on to an existing slice or if a new slice is required (1720). If the end user service can be accommodated onto an existing network slice, then the NWSM 110 sends the request to the NWSO 140 (1730). The request includes the NWS ID of the selected slice and the common CP subnetwork 120 type. It also includes the NSD for the new service. The NWSO 140 updates the selected network slice (1940), by adding the new NSD to the indicated NWS. The updated should not impact the other slices, including the slices that share a common control plane. The NWSO sends an update network slice request (1950) to the RO in the E-MANO 360 (i.e., the NFVO 361). The E-MANO 360 instantiates the new functions onto the resources allocated for the specified slice (1960). The E-MANO 360 sends an update network slice response to the NWSO 140 (1970). The NWSO 140 sends an NWSO response to the NWSM 110 (1980). The NWSO 140 updates the NWS repository 150. The NWSM 110 sends an ACK for the end user service request (1990).

Figure 20:
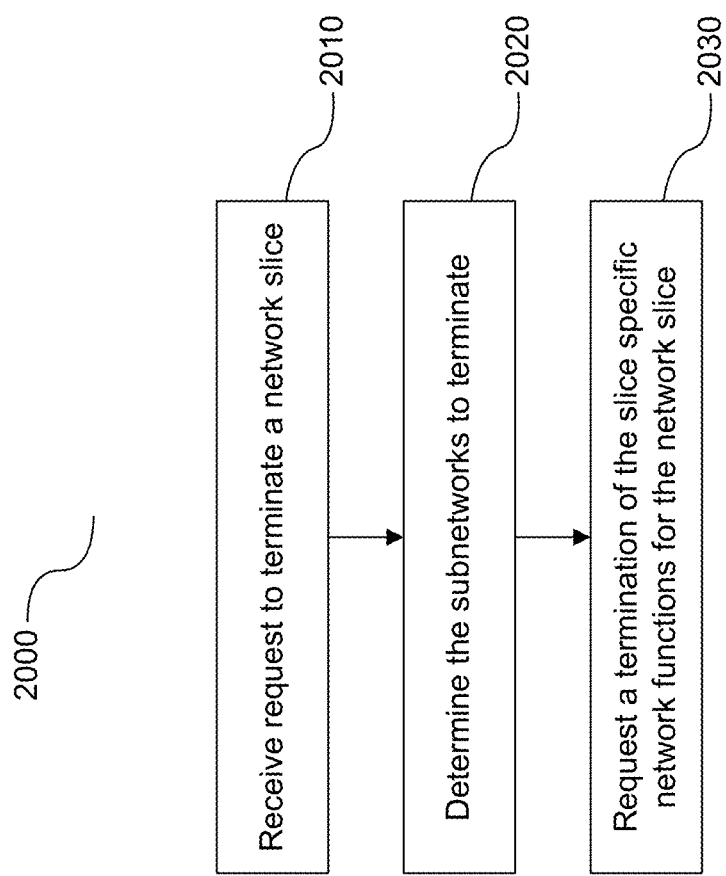
FIG. 20 illustrates, in a flow chart, a method of terminating a network slice, in accordance with an embodiment of the present invention.

FIG. 20 illustrates, in a flow chart, a method (2000) of terminating a network slice, in accordance with an embodiment of the present invention. The method comprises the NWSO 140 receiving from the NWSM 110 a request to terminate a network slice (2010). Next, the NWSO 140 determines the subnetworks to terminate (2020). Next, the NWSO 140 requests from the RO (i.e., NFVO 361) a termination of the slice specific network functions (NFs) 433 for that network slice (2030). Other steps may be added to the method (2000).

Figure 21:
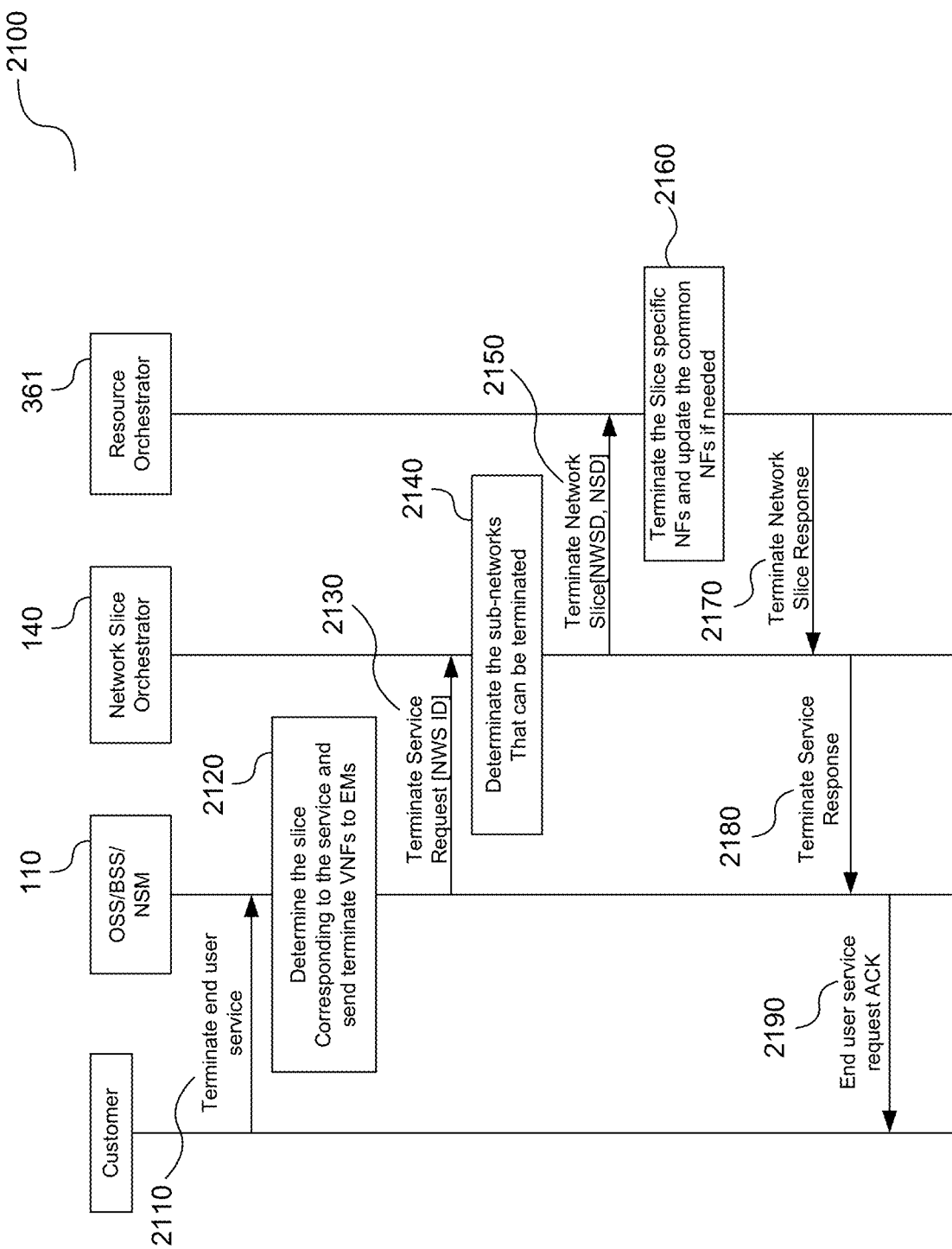
FIG. 21 illustrations in a message flow diagram a method of terminating a network slice in more detail.

FIG. 21 illustrates, in a message flow diagram, a method (2100) of terminating a network slice in more detail. If the NM 320 receives a command to terminate an end user service that is on a separate slice, then the entire slice may be terminated. The customer (i.e., service provider) sends a terminate end user service request to the NWSM 110 (2110). The NWSM 110 determines the corresponding network slice hosting the end user service and send terminate VNFs 130 to the EMS 332 (2120). The NWSM 110 sends a terminate service request to the NWSO 140 (2130). The request includes the NS-ID for the service and the corresponding NWS ID. The NWSO 140 determines the sub-networks that can be terminated (2140) (i.e. the sub-network corresponding to the NS-ID. If this is the only service on the slice, then the NWSO sends a terminate network slice to the RO (i.e., NFVO 361) (2150). The RO terminates the slice specific sub-network and updates the Common sub-network if necessary (2160). The RO sends a terminate network slice response to the NWSO 140 (2170). The NWSO 140 sends the terminate service response to the NWSM 110 (2180). The NWSO updates the NWS repository 150. The NWSM sends an ACK for the end user termination request (2190).

Figure 22:
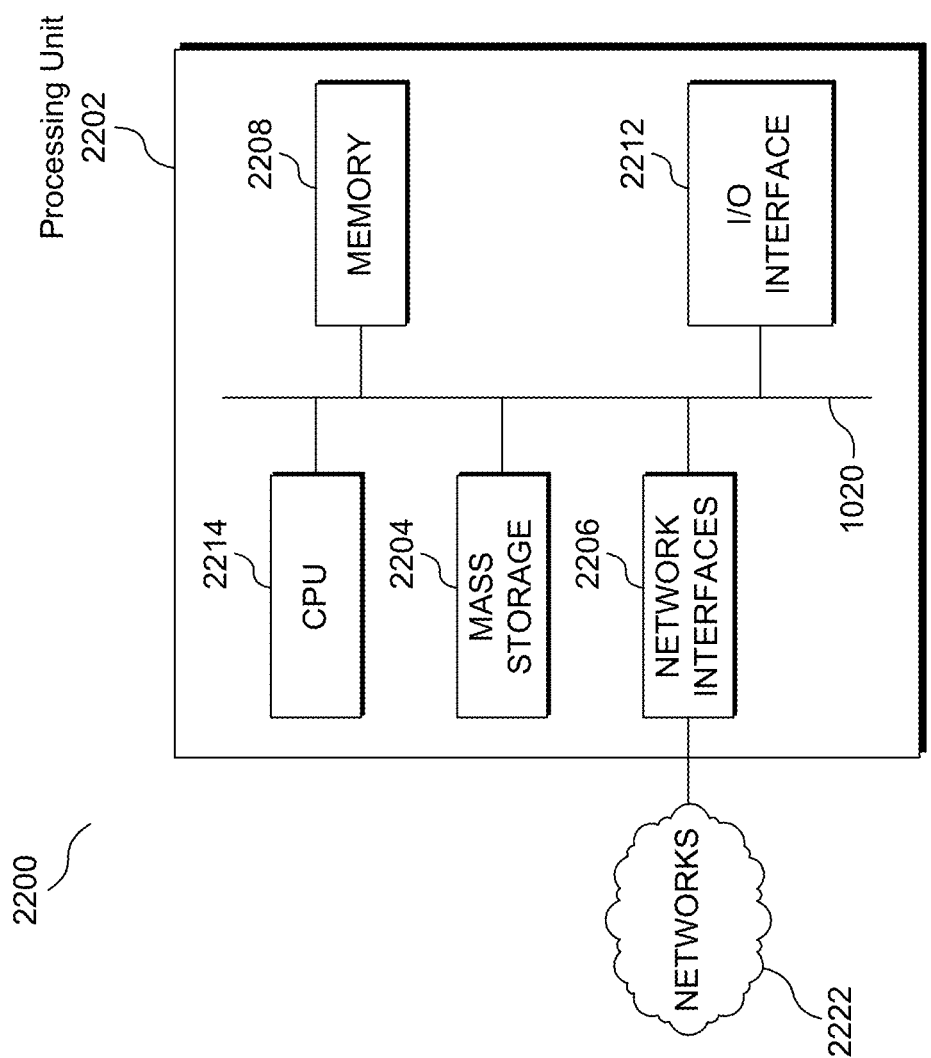
FIG. 22 illustrates, in a block diagram, a computing system that may be used for implementing the devices and methods disclosed herein.

FIG. 22 is a block diagram of a computing system 2200 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2200 includes a processing unit 2202. The processing unit includes a central processing unit (CPU) 1014, memory 2208, and may further include a mass storage device 2204, a video adapter 2210, and an I/O interface 2212 connected to a bus 2220.

The bus 2220 may be one or more of any type of several bus architectures including a memory bus or memory controller, a peripheral bus, or a video bus. The CPU 2214 may comprise any type of electronic data processor. The memory 2208 may comprise any type of non-transitory system memory such as static random access memory (SRAM), dynamic random access memory (DRAM), synchronous DRAM (SDRAM), read-only memory (ROM), or a combination thereof. The memory 2208 may include ROM for use at boot-up, and DRAM for program and data storage for use while executing programs.

The mass storage 2204 may comprise any type of non-transitory storage device configured to store data, programs, and other information and to make the data, programs, and other information accessible via the bus 2220. The mass storage 2204 may comprise, for example, one or more of a solid state drive, hard disk drive, a magnetic disk drive, or an optical disk drive.

The I/O interface 2212 may be used to provide interfaces to couple external input and output devices to the processing unit 2202.

The processing unit 2202 also includes one or more network interfaces 2206, which may comprise wired links, such as an Ethernet cable, and/or wireless links to access nodes or different networks. The network interfaces 2206 allow the processing unit 2202 to communicate with remote units via the networks. For example, the network interfaces 2206 may provide wireless communication via one or more transmitters/transmit antennas and one or more receivers/receive antennas. The processing unit 2202 may be coupled to a local-area network 2222 or a wide-area network for data processing and communications with remote devices, such as other processing units, the Internet, or remote storage facilities.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

It should be understood that in an embodiment, there is provided a method of terminating a network slice comprising: receiving, by a NWSO from a NWSM, a request to terminate a network slice; determining, by the NWSO, the subnetworks to terminate; and transmitting, by the NWSO to a RO, a request for a termination of the slice specific network functions (NFs).

In embodiments of this method, the request to terminate the network slice comprises the NWSO receiving the NWS-ID of the network slice. In other embodiments, determining the subnetworks that can be terminated comprises locating all NWSFG IEs in a NWS repository that reference a slice specific NSD that matches a network service requested to be terminated. In other embodiments, the request for the termination of the slice specific NFs comprises sending the NWSD of the network slice and the network service descriptor (NSD) of a service on the slice to the RO. In another embodiment, the method can further include the steps of receiving a terminate network slice response from the RO; and sending a terminate service response to the NWSM. In another embodiment, the method can include transmitting a request to the RO for an update of Common NFs associated with the network slice. In a further embodiment, the method can include receiving a request to terminate an end user service; determining the network slice corresponding to end user service; and sending requests to terminate the virtual network functions (VNFs) to element managements (EMs).

Those skilled in the art will appreciate that the recited embodiments and variations of this method can be combined with each other. Furthermore, a node to carry out this method should also be understood to be contemplated.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method comprising:
receiving, by a slice selection function (SSF), a slice selection request associated with a user equipment (UE)'s attach request, wherein the slice selection request includes a network slice identifier from the UE's attach request;
selecting, by the slice selection function, a slice for providing a requested service indicated in the UE's attach request wherein the selected slice corresponds to the network slice identifier;
selecting a set of control plane network functions associated with the selected slice, wherein at least one of the selected control plane network functions is commonly associated to at least two network slices;
transmitting, by the slice selection function, a response to the slice selection request, the response comprising identifications each of which corresponds to one control plane network function in the set of the control plane network functions and the network slice identifier; and
upon receiving, by an access network (AN) node, the identifications each of which corresponds to one control plane network function in the set of control plane network functions and the network slice identifier, sending, by the AN, an attach request of the UE to a control plane network functions selected from the set of control plane network functions and
selecting, by the slice selection function, a set of user plane (UP) network functions, wherein the response further includes identifications each of which corresponds to one user plane network function in the set of the user plane network functions.

2. The method of claim 1, wherein the SSF: selects the set of CPNF based on the network slice identifier.

3. The method of claim 1 wherein the slice selection request is associated with the UE's attach request by common parameters.

4. The method of claim 1 wherein the slice selection request is associated with the UE attach request in that the slice selection request is responsive to the UE attach request.

5. The method of claim 1 wherein the UE's attach request includes a service type ID.

6. A communication system comprising:
a processor; and
a memory for storing instructions that when executed by the processor implement a slice selection function (SSF) and an access network (AN) node, wherein the SSF is implemented to:
receive a slice selection request associated with a user equipment (UE)'s attach request, wherein the slice selection request includes a network slice identifier from a user equipment (UE) attach request; and
select a slice for providing a requested service indicated in the UE's attach request wherein the selected slice corresponds to the network slice identifier;
select a set of control plane (CP) network function (CPNF) associated with the selected slice; and
selecting, by the slice selection function, a set of user plane (UP) network functions,
transmit a response to the slice selection request, the response comprising identifications each of which corresponds to one control plane network function in the set of the control plane network functions and the network slice identifier; wherein the response further includes identifications each of which corresponds to one user plane network function in the set of the user plane network functions; and the AN node is implemented to:
receive the identifications each of which corresponds to one control plane network function in the set of control plane network functions and the network slice identifier, and
send an attach request of the UE to a control plane network function selected from the set of control plane network functions.

7. The communication system of claim 6 wherein the SSF is further implemented to select the (CP NF)-based on the network slice identifier.

8. The communication system of claim 6 wherein the slice selection request is associated with the UE's attach request by common parameters.

9. The communication system of claim 6 wherein the slice selection request is associated with the UE attach request in that the slice selection request is responsive to the UE's attach request.

10. The communication system of claim 6 wherein the CP NF is a mobility management (MM) Network Function (NF).

11. The communication system of claim 10 wherein the selected CP NF is commonly associated to at least two network slices.

12. The communication system of claim 6 wherein the SSF is further implemented to select a set of user plane (UP) NFs, wherein the response further includes identifications each of which corresponds to one UP NF in the set of the UP NFs.

13. The method of claim 1 wherein the slice selection request is received from the AN node, and the response is sent to the AN node.

14. The method of claim 1 wherein the slice selection request is received from a core network function, and the response is sent to the core network function.

15. The method of claim 14 wherein the core network node is an initial mobility management function.

16. The method of claim 1 wherein the US's second attach request includes the network slice identifier and an identification of the selected CF NF, wherein the method further comprises: performing, by the selected CP NF, authentication and authorization based on the UE's second attach request; and setting up, by the selected CP NF, a CP connection for the UE to control how to transmit the UE's data.

17. The method of claim 1 further comprising: selecting, by the AN node, the CP NF from the set of CP NFs.

18. The communication system of claim 6 wherein the UE's second attach request includes the network slice identifier and an identification et the selected CP NF; wherein instructions that when executed by the processor further implement the selected CP NF, wherein the selected CP NF is implemented to: performing authentication and authorization based on the UE's second attach request; and set up a CP connection for the UE to control how to transmit the UE's data.

19. The communication system of claim 18 further comprising the AN node configured to select he CP NF from the set of CP NFs.

20. The method of claim 1 wherein selecting a set of control plane (CP) network functions (NFs) associated with the selected slice comprises selecting a plurality of CP NFs which are commonly associated to at least two network slices.

* * * * *